(12) United States Patent
Janssen et al.

(10) Patent No.: US 9,271,506 B2
(45) Date of Patent: Mar. 1, 2016

(54) SYSTEM FOR CONVEYING CARCASSES OR CARCASS PARTS OF QUADRUPED SLAUGHTER ANIMALS

(71) Applicant: MAREL MEAT PROCESSING B.V., Oss (NL)

(72) Inventors: Cornelis Joannes Janssen, Holthees (NL); Barend Jacobus Emmanuel Beijaard, Oploo (NL); Franciscus Theodorus Henricus Johannes Van Der Steen, Megen (NL); Franciscus Albertus Gerardus Van Den Hurk, Geffen (NL)

(73) Assignee: MAREL MEAT PROCESSING B.V., Oss (NL)

( * ) Notice: Subject to any disclaimer, the term of this patent is extended or adjusted under 35 U.S.C. 154(b) by 0 days.

(21) Appl. No.: 14/408,112

(22) PCT Filed: Nov. 28, 2012

(86) PCT No.: PCT/NL2012/050844
§ 371 (c)(1),
(2) Date: Dec. 15, 2014

(87) PCT Pub. No.: WO2014/007607
PCT Pub. Date: Jan. 9, 2014

(65) Prior Publication Data
US 2015/0173376 A1   Jun. 25, 2015

(30) Foreign Application Priority Data
Jul. 4, 2012 (NL) ...................................... 2009120

(51) Int. Cl.
A22B 7/00     (2006.01)

(52) U.S. Cl.
CPC .................. *A22B 7/002* (2013.01); *A22B 7/005* (2013.01)

(58) Field of Classification Search
USPC ......... 452/185, 187–192, 177, 183, 182, 117, 452/118; 198/347.1, 448, 465.2, 465.1, 198/463.3
See application file for complete search history.

(56) References Cited

U.S. PATENT DOCUMENTS 1,333,424 A * 3/1920 Kirk ............................. 452/187
1,542,196 A * 6/1925 Waugh ......................... 452/119
(Continued)

FOREIGN PATENT DOCUMENTS

EP            1 658 774 A1   5/2006
WO    WO 2011/074966 A1    6/2011

*Primary Examiner* — Richard Price, Jr.
(74) *Attorney, Agent, or Firm* — Birch, Stewart, Kolasch & Birch, LLP

(57) ABSTRACT

A system for conveying carcasses or carcass parts of quadruped slaughter animals includes at least one carrier. The carrier includes a first jaw element, which has an engagement face for engaging the carcass or carcass part, a second jaw element, which has an engagement face for engaging the carcass or carcass part. The carrier further includes a tensioning structure, the connection between the first connection zone of the tensioning structure and the first jaw element and the connection between the second connection zone of the tensioning structure and the second jaw element being such that when the jaw elements move relative to each other when receiving a carcass or carcass part in the retaining part of the holding slot, the first connection zone moves along with the first jaw member and the second connection zone moves along with the second jaw member, which movement of the connection zones causes elastic deformation of the tensioning structure, the elastic deformation providing a clamping force to the engagement faces of the jaw elements such that the carcass or carcass part is retained in the holding slot by clamping a part of the carcass or carcass part between the engagement face of the first jaw element and the engagement face of the second jaw element.

27 Claims, 41 Drawing Sheets

(56) References Cited

U.S. PATENT DOCUMENTS

| | | | |
|---|---|---|---|
| 2,448,421 A * | 8/1948 | Davis | 452/188 |
| 2,483,631 A * | 10/1949 | Fashing | 452/190 |
| 2,584,377 A * | 2/1952 | Wunderlich | 452/183 |
| 2,605,496 A * | 8/1952 | Spang | 452/118 |
| 2,625,707 A * | 1/1953 | Liittjohann | 452/183 |
| 2,739,347 A * | 3/1956 | Sharp et al. | 452/183 |
| 3,376,600 A * | 4/1968 | Shadley | 452/183 |
| 4,372,009 A * | 2/1983 | Linville | 452/183 |
| 5,375,297 A * | 12/1994 | Lautenschlager et al. | 16/249 |
| 5,549,521 A * | 8/1996 | van den Nieuwelaar et al. | 452/118 |
| 6,152,816 A * | 11/2000 | van den Nieuwelaar et al. | 452/177 |
| 6,244,951 B1 | 6/2001 | Leining | |

* cited by examiner

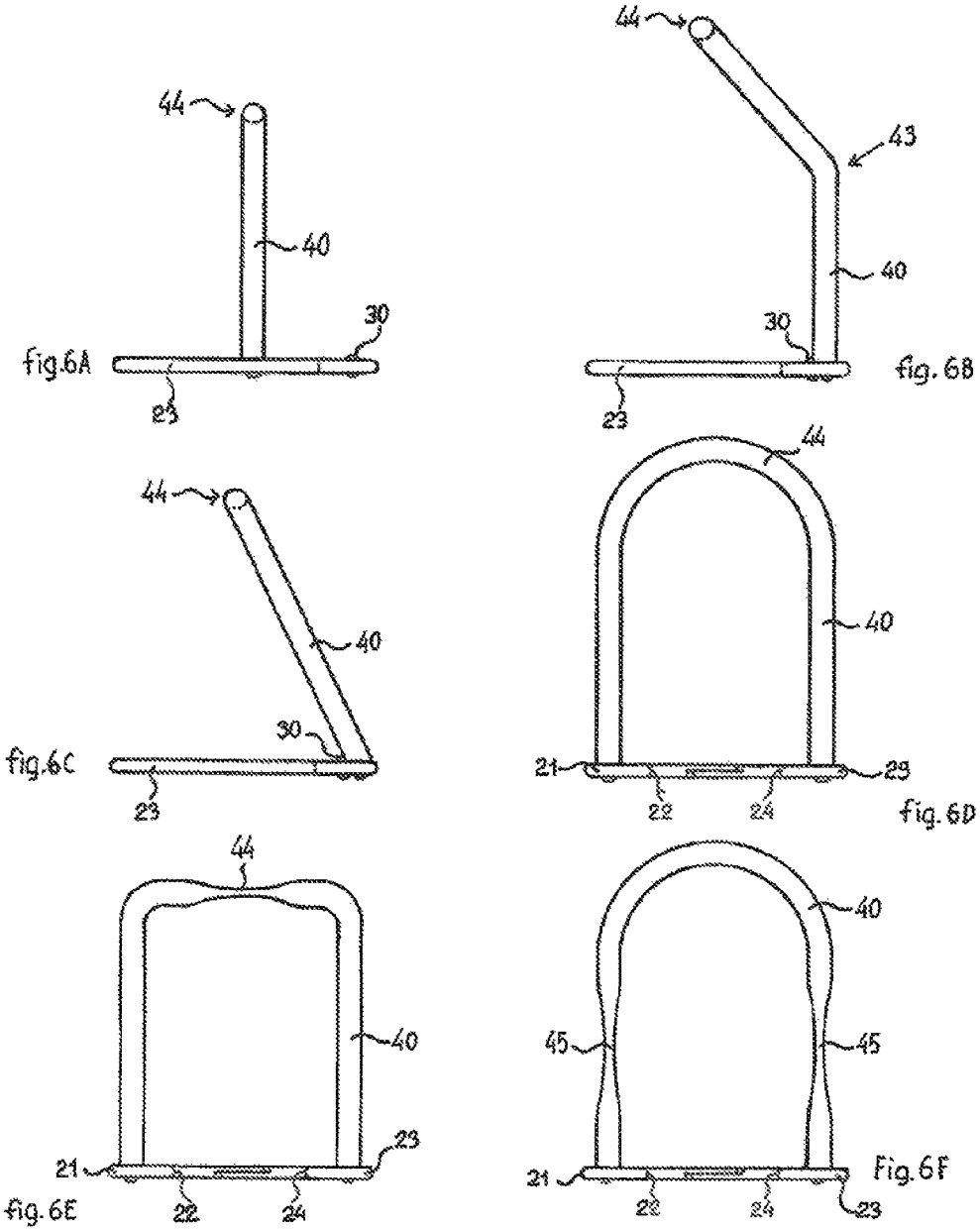

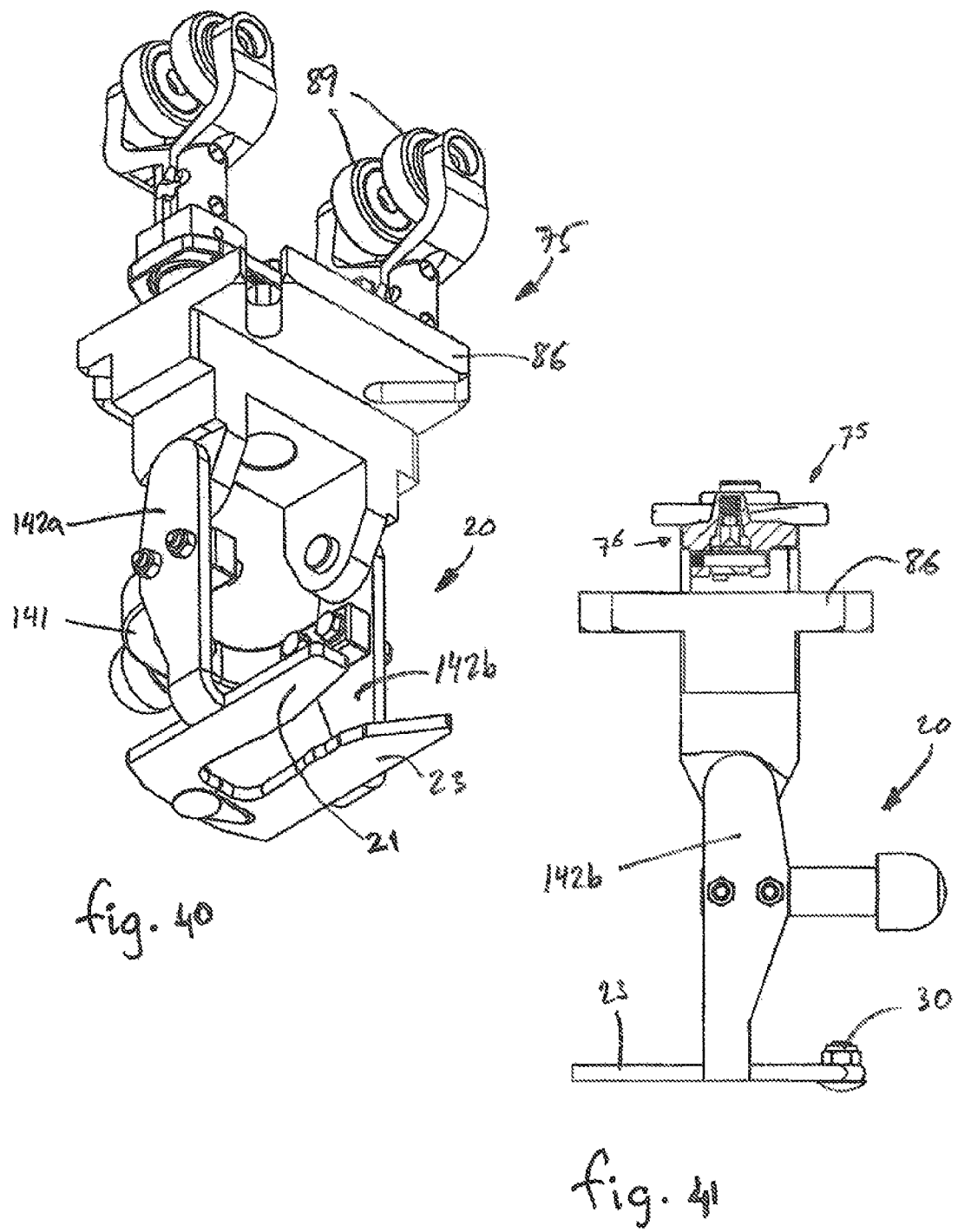

SYSTEM FOR CONVEYING CARCASSES OR CARCASS PARTS OF QUADRUPED SLAUGHTER ANIMALS

The invention pertains to a system for conveying carcasses or carcass parts of quadruped slaughter animals. Such systems are used for the transport of carcasses or carcass parts of porcine, bovine, ovine and/or caprine animals through a slaughterhouse or meat processing plant.

In this document the term porcine animal or pig also includes sows, gilts, barrows, boars and feeder pigs.

In this document the term bovine animal covers cattle, steers, heifers, cows, bulls and also buffalo.

In this document the term ovine animals covers sheep and lamb.

In this document the term caprine animals covers goats.

All these are for the purpose of this application regarded as being red meat.

The slaughtering of red meat slaughter animals and the subsequent cutting up of the carcasses takes place in slaughterhouses and/or meat processing plants. Even in relatively modern slaughterhouses and red meat processing plants, many of the processes are carried out partly or entirely by hand. This is at least partly due to the variation in shapes, sizes and weights of the carcasses and carcass parts to be processed and to the harsh environmental conditions that are present in the processing areas of slaughterhouses and red meat processing plants. This manual or semi-automated processing results in harsh labouring conditions for the workers and in high labour costs.

The different processing steps in the processing of carcasses and/or carcass parts generally take place at different processing stations. After a processing step is carried out in a processing station, the carcass or carcass part is transported to a next processing station, in which the next processing step is carried out. It is possible that the carcasses and/or carcass parts are transported intermittently, so that they do not move relative to the processing station when the processing step is carried out. As an alternative it is possible that the carcasses and/or carcass parts are conveyed in a continuous way, so that they move relative to the processing station during the time the processing step is carried out. A processing station can include an automatic or semi-automatic processing device, but alternatively or in addition it can comprise a working position for an operator who manually performs a processing step.

The present invention relates most prominently to the processing and/or conveying of carcass parts of slaughtered pigs, such as leg parts, hams, and shoulder parts of pigs, or half hogs. However, the invention may also be applied for the other animals mentioned above.

WO2011/074966 describes a system for processing carcasses and/or carcass parts of quadruped slaughter animals. In the system of WO2001/074966, an overhead conveyor is present. A plurality of carriers is connected to this overhead conveyor. A carcass or carcass part is carried by one or more of these carriers.

WO2011/074966 discloses a carrier which comprises a plate with a pig foot slot therein. This carrier is adapted to hold a carcass or carcass part that still comprises the foot of the pig, in particular the part of the foot with the metatarsal bones in. The pig foot slot is adapted to receive the foot and force the metatarsal bones out of their natural position. The reaction force caused by this displacement of the metatarsal bones is meant to ensure that the pig foot is held firmly.

However, practice has shown a drawback of the known carrier is that sometimes the foot is not held firmly enough. Furthermore, in some cases damage to the tissue of the foot occurs.

The object of the invention is to provide a system with an alternative carrier, which carrier preferably is an improvement of the known carrier.

This object is achieved with the system of claim 1.

In the system according to the invention, a carrier is used that comprises a first jaw element and a second jaw element. Each jaw element has an engagement face that is adapted to be in contact with the carcass or carcass part when the carcass or carcass part is arranged in the carrier. In use, the carcass or carcass part is clamped between the engagement faces of the jaw elements.

In an advantageous embodiment, at least one jaw element is a jaw plate. It is also possible that both jaw elements are jaw plates.

The engagement faces of both jaw elements face each other, but they do not contact each other when a carcass or carcass part is held in the carrier. Preferably, they do not contact each other when no carcass or carcass part is held by the carrier.

Between the engagement faces, a holding slot is present. The holding slot has a retaining part, in which a part of the carcass or carcass part is arranged when the carrier is used. The engagement faces of the jaw elements define opposite sides of the retaining part of the holding slot. The engagement faces of the jaw elements may extend substantially parallel to each other, such that the retaining part of the holding slot has a substantially rectangular or square shape. The engagement faces alternatively may be at an angle relative to each other, such that the retaining part of the holding slot has a V-shape. In case that the jaw elements are pivotable relative to each other, there may be one relative position of the jaw elements in which the engagement faces are substantially parallel to each other, while in all other relative positions of the jaw elements the engagement faces are at an angle relative to each other.

In quadruped slaughter animals, the natural variation in size of carcasses, carcass parts and elements of carcasses or carcass parts is quite large. Even within the same type of carcass parts (e.g. hams or fore-ends) the variation in size usually is quite significant between parts from different individual animals. Each type of carcass or carcass part has a part or an element which is typically arranged in the holding slot of the carrier. Such a part or element may for example be an elongate bone with soft tissue thereon. The natural variation of the size of those parts or elements in practice is rather large as well, in particular far larger than for example in poultry. In poultry, not only the animals are smaller and lighter, but also the natural variation of body dimensions is less than in quadrupeds.

The carrier according to the invention has a holding slot with a retaining part that has a variable width. The width of the retaining part of the holding slot is variable over a range that extends between a minimum width and a maximum width. The minimum width and the maximum width are chosen with the size range and/or weight range of carcasses or carcass parts to be processed in mind, in particular in relation to the expected size range of the part or element of the carcass or carcass part that is arranged in the retaining part of the holding slot.

The minimum width of the retaining part of the holding slot between the engagement faces of the jaw elements is chosen such that a carcass or carcass part of an animal of relatively small build can be reliably clamped in the retaining part of the holding slot. In particular, the expected size range of the part or element of the carcass or carcass part that is arranged in the retaining part of the holding slot is considered. For example, if the part or element to be arranged in the retaining part of the holding slot is a bone with a more or less circular cross section, the expected diameter range of that bone (possibly including any soft tissue thereon), is considered. The minimum width of the retaining part of the holding slot will generally be chosen such that it is smaller than the minimum expected diameter of the bone by which the carcass or carcass part will be held in the holding slot. In case of any pretensioning of the jaw elements, the minimum width of the retaining part of the holding slot may be chosen such that it is the same or generally the same as the minimum expected diameter of the bone by which the carcass or carcass part will be held in the holding slot. If the part or element of the carcass or carcass part that is to be arranged in the holding slot is not a bone with a more or less circular cross section, that part or element will have an other kind of relevant dimension, for example a width. In such a case, the expected range of that relevant dimension will be considered when selecting a minimum width for the width range of the retaining part of the holding slot.

The minimum width may be zero, but preferably it is larger than zero.

The maximum width of the retaining part of the holding slot between the engagement faces of the jaw elements is chosen such that a carcass or carcass part of an animal of relatively large build can be reliably clamped in the retaining part of the holding slot without doing undesirable damage to the carcass or carcass part, such as an undesirable amount of bruising. In particular, the expected size range of the part or element of the carcass or carcass part that is arranged in the retaining part of the holding slot is considered. For example, if the part or element to be arranged in the retaining part of the holding slot is a bone with a more or less circular cross section, the expected diameter range of that bone (possibly including any soft tissue thereon), is considered. The maximum width of the retaining part of the holding slot will generally be chosen such that it is about the same as than the maximum expected diameter of the bone by which the carcass or carcass part will be held in the holding slot, or slightly larger. If the part or element of the carcass or carcass part that is to be arranged in the holding slot is not a bone with a more or less circular cross section, that part or element will have an other kind of relevant dimension, for example a width. In such a case, the expected range of that relevant dimension will be considered when selecting a maximum width for the width range of the retaining part of the holding slot.

For example, when carcasses or carcass parts of pigs are processed, a typical value of the minimum width is between 20 and 65 mm and a typical value of the maximum width is between 50 and 125 mm.

When there is no carcass or carcass part arranged in the holding slot of the carrier, the retaining part of the holding slot may have a predefined width, for example the minimum width. Upon introduction of a carcass or carcass part, the jaw elements move relative to each other such that the carcass or carcass part is accommodated in the retaining part of the holding slot and clamped between the engagement faces.

The distance between the engagement faces of the jaw elements can be regarded as the width of the retaining part of the holding slot. However, for example in embodiments in which the jaw elements rotate relative to each other, it may be more convenient to express the width of the retaining part of the holding slot in terms of the angle the engagement faces have relative to each other.

The carrier further comprises a tensioning structure. The tensioning structure has a first connection zone and a second connection zone. The first connection zone is connected to the first jaw element and the second connection zone is connected to the second jaw element. The connection between the first connection zone of the tensioning structure and the first jaw element and the connection between the second connection zone of the tensioning structure and the second jaw element is such that when the jaw elements move relative to each other when receiving a carcass or carcass part in the retaining part of the holding slot, the first connection zone moves along with the first jaw member and the second connection zone moves along with the second jaw member. This movement of the connection zones causes elastic deformation of the tensioning structure.

The resistance of the tensioning structure against this elastic deformation provides a clamping force to the engagement faces of the jaw elements. This clamping force makes that the carcass or carcass part is retained in the holding slot by clamping a part of the carcass or carcass part between the engagement face of the first jaw element and the engagement face of the second jaw element.

The elasticity of the tensioning structure is defined as the amount of force that is necessary to obtain a defined level of relative displacement of the jaw elements relative to each other (e.g. 1 cm) or as the amount of relative displacement of the jaw elements that is obtained by a defined level of force (e.g. 100 Newton). The relative displacement of the jaw elements can be a translation (expressed e.g. in mm or cm), a rotation (expressed in degrees) or a combination of both.

The elasticity of the tensioning structure is selected such that the clamping force is enough to reliably clamp the carcass or carcass part between the engagement faces of the jaw elements, but not so much that is damages the carcass or carcass part in the holding slot to an undesirable extent. This means that the level of elasticity of the tensioning structure has to be selected in accordance with the expected weight range and the vulnerability of the type of carcass or carcass part to be retained in mind. Also the expected size range of the part or element of the carcass or carcass part that is to be retained in the carrier has to be taken into account when designing the tensioning structure, because that determines the width range of the retaining part of the holding slot and amount of relative displacement of the jaw elements. Therefore, for different types of carcasses or carcass parts, different designs, shapes and/or sizes may be used for the tensioning structure In a possible embodiment, the tensioning structure is an elastic bar. The elastic bar may be subjected to bending, torsion, tension and/or pressure when the jaw elements are moved relative to each other, in particular when the jaw elements are moved relative to each other by the introduction of a carcass or carcass part in the retaining part of the holding slot.

The elastic bar may have a substantially constant elasticity over its length. Alternatively, the elastic bar may have zones with different, preferably significantly different, elasticity. In such an embodiment one or more zones may be significantly more rigid than others, so the deformation mainly occurs in the more flexible zone or zones. By having such zones of distinct levels of elasticity, the deformation can be concentrated in certain areas of the elastic bar. Zones of different elasticity may for example be realized by varying the diameter or other cross sectional dimension of the elastic bar.

The tensioning structure may comprise a single elastic bar or multiple elastic bars.

An elastic bar may be straight, curved or a combination of straight parts and curved parts.

Suitable materials for the elastic bar are for example spring steel, stainless steel, stainless spring steel and plastic materials, such as polymers, resins, or reinforced polymers or resins. For the reinforcement, for example carbon fibers may be used.

The elastic bar can be a straight or curved rod, for example a rod with circular, square, rectangular, oval, octagonal or hexagonal cross section. The elastic bar may be generally U-shaped, either with two bends or with a single bend between the legs of the U-shape. The legs of the U-shape can be either parallel, substantially parallel or at a relative angle to each other. Alternatively, a bar having a different shape, e.g. a V-shape, an inverted V-shape, a Y-shape or an inverted Y-shape, may be used.

In a possible embodiment, the elastic bar has a first end and a second end opposite the first end. The first end is connected to the first jaw element and the second end is connected to the second jaw element. For example, a U-shaped, V-shaped or Y-shaped elastic bar is suitable for such an embodiment.

In a possible embodiment, the tensioning structure may comprise a bracket. Such a bracket could have has a first leg, a second leg and a connection piece that connects the first leg to the second leg. The connection piece could for example be a cross bar. The first leg of the bracket has a connection zone which is connected to the first jaw part and the second leg of the bracket has a connection zone which is connected to the second jaw part. The connection zone can be at the end of the respective leg, but this is not necessary. The connection between the first leg of the bracket and the first jaw element and the connection between the second leg of the bracket and the second jaw element is such that when the jaw elements move relative to each other when receiving a carcass or carcass part in the retaining part of the holding slot, the connection zone of the first leg moves along with the first jaw member and the connection zone of the second leg moves along with the second jaw member. This movement causes elastic deformation of the bracket, which elastic deformation provides the clamping force.

The bracket could be substantially H-shaped, with the two bottom ends each being connected to a jaw element and the two top ends being connected to a trolley of an overhead conveyor or other type of conveyor. Alternatively, the bracket could be U-shaped, V-shaped or Y-shaped.

In a possible embodiment, if the bracket has a connection piece, the connection piece of the bracket may be distinctly more flexible than the legs of the bracket, or it may have a portion is distinctly more flexible than the legs of the bracket. This way, the deformation of the tensioning structure is concentrated in the connection piece or in the flexible part thereof.

Suitable materials for the bracket or parts thereof are for example spring steel, stainless steel, stainless spring steel and plastic materials, such as polymers, resins, or reinforced polymers or resins. For the reinforcement, for example carbon fibers may be used.

Different parts of the bracket can be made of different materials. For example, the connection piece may be of a different material than the legs of the bracket. In an advantageous embodiment, the connection piece is made of plastic (preferably a food approved plastic) and the legs are made of steel, preferably stainless steel.

In a possible embodiment, the tensioning structure may comprise a leaf spring or consist of one or more leaf springs.

In a possible embodiment, the first jaw element and the second jaw element may be connected to each other by means of an elastic hinge. This elastic hinge may be dimensioned such that it is or forms part of the tensioning structure.

In a possible embodiment, the tensioning structure may provide a pre-tensioning force such that the first and second jaw elements are biased towards a relative position in which the retaining part of the holding slot has the minimum width. Alternatively, a separate pre-tensioning element my be present to provide a pre-tensioning force.

The pre-tensioning force has the effect that a threshold force has to be overcome to move the first and/or second jaw element away from each other such that the retaining part of the holding slot is widened. This assists in reliable clamping of the carcass or carcass part in the holding slot of the carrier. For example, in case of holding a pig carcass or carcass part, such a threshold force may be somewhere in the range of 350 to 700 N.

Retaining the carcass or carcass part in the carrier by means of clamping the carcass or carcass part into the holding slot has the advantage that if the carcass or carcass part is transported by the carrier and the carcass or carcass part somehow gets jammed, the carcass or carcass part is pulled out of the carrier without severe damage to the carrier and/or the carcass or carcass part. With a carrier in which the carcass or carcass part is locked into the carrier by the shape of the holding slot (for example by closing off or narrowing the entrance portion of the holding slot after the carcass or carcass part has been introduced into the holding slot), the damage to the carrier and/or carcass or carcass part generally is significantly larger in case of a jam-up.

The use of a tensioning structure to provide the clamping force instead of e.g. a coil spring provides a robust construction of the carrier. It also provides a carrier that can be cleaned easier and more thoroughly. Therewith, the use of carriers according to the invention contributes to obtaining high levels of hygiene and food safety in the meat processing plant.

In general, it is advantageous if the part or element of the carcass or carcass part that is to be clamped in the retaining part of the holding slot has a rigid part, for example a bone, in it.

The carcass or carcass part may comprise a part or element having a bone—for example an elongate bone—that is still at least partly covered by soft tissue, such as skin, rind, fat, meat or the like, or a combination of such tissues. Such a part or element of the carcass or carcass part can be arranged in the retaining part of the holding slot when the carcass or carcass part is retained in the carrier in such a way that the engagement faces engage said soft tissue. The presence of soft tissue generally allows for a firmer grip onto the carcass or carcass part. In particular when the soft tissue is deformed somewhat by the carrier, the grip is firmer than when the engagement faces would engage directly on bare bone instead of on soft tissue on the bone. Preferably, both engagement faces engage soft tissue, but it is also possible that just one of the engagement faces engages soft tissue.

In a possible embodiment, at least one jaw element is a jaw plate. In such an embodiment, the jaw element is generally flat and it has a suitable contour shape and/or perimeter. This allows the jaw elements to be manufactured relatively easily. The engagement face of a jaw element may be rounded in order to avoid damage to the carcass or carcass part when the carcass or carcass part is clamped between the engagement faces of the jaw elements. A rounded engagement face is also possible when a jaw elements is not a jaw plate.

In a possible embodiment, the first and second jaw element are connected to each other. This connection could for example be realized by means of a hinge or slide mechanism, or by one or more leaf springs. In case the jaw elements are connected to each other by means of a hinge or slide mechanism, the relative movement of the jaw elements takes places according to a predetermined path that is defined by the hinge or slide mechanism.

The hinge may be realized by a hinge pin, which is preferably made of a harder material than the jaw element. The hinge pin may be connected to one of the jaw elements and extend through an aperture in the other jaw element, or the hinge pin may extend through an aperture in both jaw elements.

Alternatively, the hinge may be an elastic hinge. An elastic hinge could be a relatively narrow dam of material that extends between the first jaw element and the second jaw element, which dam can be elastically deformed. The dam can be straight or curved, e.g. S-shaped.

In particular when a hinge connects the first and the second jaw element, the position of the connection zones of the tensioning structure (that connect the tensioning structure to the jaw elements) relative to the position of the hinge determines the amount of deformation to which the tensioning structure will be subjected during relative movement of the jaw elements when the width of the retaining part of the holding slot changes. The amount of deformation influences the levels of material stresses that occur in the tensioning structure, and therewith the fatigue life of the tensioning structure.

The connection between the tensioning structure and the first jaw element can be rigid. This way, the first connection zone of the tensioning structure (that is connected to the first jaw element) moves along with the first jaw element in all degrees of freedom. Alternatively, this connection can be such that a relative rotation between the first jaw element and the tensioning structure, in particular the first connection zone of the tensioning structure that is connected to the first jaw element, is possible. In this embodiment, the torsion load on the tensioning structure can be reduced or—dependent on the geometry—even eliminated.

The connection between the tensioning structure and the second jaw element can be rigid. This way, the second connection zone of the tensioning structure (that is connected to the second jaw element) moves along with the second jaw element in all degrees of freedom. Alternatively, this connection can be such that a relative rotation between the second jaw element and the tensioning structure, in particular second connection zone of the tensioning structure that is connected to the second jaw element, is possible. In this embodiment, the torsion load on the tensioning structure can be reduced or—dependent on the geometry—even eliminated.

In a possible embodiment, the tensioning structure is attached to the jaw elements (or to one of the jaw elements) in a releasable way.

The tensioning structure may extend under an angle to the jaw elements. In particular, when the jaw elements are jaw plates, the tensioning structure may extend under an angle relative to the plane of the jaw plates. The tensioning structure may be under an angle relative to the jaw elements when seen from the side of the carrier, or when seen from the front or back.

In a possible embodiment, one end of the holding slot is open, preferably also when the carrier is in use, i.e. when a carcass or carcass part is arranged in the carrier. This allows easier removal of the carcass or carcass part from the carrier in case of a jam up or other kind of emergency.

In a possible embodiment, an abutment or other movement restricting arrangement is present that prevents the width of the retaining part of the holding slot becoming smaller than the minimum width. Such an abutment may for example be realized by a protrusion on one jaw elements or on both jaw elements. It is also possible that an abutment or other movement restricting arrangement is present that prevents that the width of the retaining part of the holding slot becomes larger than the maximum width.

In a possible embodiment an adjuster is provided that allows adjustment of the minimum and/or maximum width of the retaining part of the holding slot. Such an adjuster could for example be an adjuster screw which forms or displaces an abutment. In such an embodiment, the minimum and/or maximum width are adjustable.

In a possible embodiment, the carrier according to the invention is adapted to be used for conveying a pig carcass or pig carcass part, in particular a pig carcass or pig carcass part that still comprises at least one foot.

In such an embodiment, it is possible that the carrier is adapted to hold such a carcass or carcass part by the foot or a portion of the foot. The holding slot may be adapted such that foot bones (e.g. the lateral metatarsal or lateral metacarpal bones) in the pig foot are pressed from their natural position to a position closer to the engagement face of the first or the second jaw element.

In a possible embodiment, the shape of the engagement face of the first jaw element and the shape of the engagement face of the second jaw element of the carrier are mirror images of each other. In a further possible embodiment the shape of the first jaw element and the shape of the second jaw element are mirror images of each other. In particular when the jaw elements are jaw plates this facilitates the manufacturing process of the carriers and the logistics of spare parts. In that case, the first jaw element and the second jaw element can be manufactured as identical parts. Upon assembly, one of the jaw elements is simply flipped over such that a carrier according to the invention can be obtained.

In a possible embodiment, the carrier further comprises a locking element for locking the carcass or carcass part into the holding slot of the carrier. Such a locking element may extend at least partly over or within the holding slot. The locking element may be mounted on a lever, e.g. a spring loaded lever. Possibly, the locking element is adapted to release the carcass or carcass part from the holding slot of the carrier when a force on the carcass or carcass part exceeds a predetermined threshold value. Although the locking element as such can make the release of a jammed carcass or carcass part more difficult, there may be situations where such a locking device is desired.

Carriers according to the invention may be combined with an overhead conveyor system, which overhead conveyor system may comprise a track and a plurality of trolleys, and a drive system which is adapted to move the trolleys along said track. Each carrier may be connected to one or more trolleys of the overhead conveyor system. A system like this may be used to convey carcasses and/or carcass parts through a slaughterhouse or meat processing plant.

In a possible embodiment, the trolley or trolleys engage the carrier by the tensioning structure. This could influence the elastic behaviour of the tensioning structure in use, so that should be taken into account when designing the tensioning structure.

The connection between the trolley or trolleys and the carrier can be rigid, but alternatively the carrier can be moveable relative to the trolley or trolleys, for example pivotable.

Advantageously, the carrier is connected to the trolley or trolleys in such a way that the jaw elements are substantially horizontal when a carcass or carcass part is arranged in the carrier.

In a possible embodiment, at least one of the carriers comprises a control element for controlling the position and/or orientation of the carrier relative to the trolley and/or relative to the track. This allows tilt or rotation of the carcass or carcass part such that it for example can be presented to an operator in a suitable and/or ergonomic way.

The control element may be a cam roller, which is for example attached to the first or the second jaw element. In this embodiment, preferably the system further comprises a stationary guide which is arranged adjacent to the track of the overhead conveyor in such a way that the cam roller engages the stationary guide when the carrier with the cam roller moves along the stationary guide.

In a possible embodiment, the system comprises one or more processing stations for manually, automatically or semi-automatically carrying out one or more process steps on the carcass or carcass part while the carcass or carcass parts are retained in a carrier, which processing stations are arranged along the track of the overhead conveyor.

The invention will be explained in more detail under referral to the drawing, in which non-limiting embodiments of the invention are shown. The drawing shows in:

FIG. 1: an example of a system for processing a carcass part of a quadruped slaughter animal, FIG. 2: a first embodiment of a carrier according to the invention, FIG. 3: a variant of the embodiment of FIG. 2, FIG. 4A: an example of a carcass part arranged in a carrier according to the invention, FIG. 4B-4I, 4E*, 4F*: skeletons and body parts of different animals, indicating advantageous parts to arrange in the retaining part of the holding slot, FIG. 5: a further embodiment of a carrier according to the invention, FIG. 5A: a variant of the embodiment of FIG. 5, FIG. 6A-F: several variations of the elastic bar, FIG. 7: a further embodiment of the invention, FIG. 8: a further embodiment of the invention, FIG. 9: a further embodiment of the invention, FIG. 10: a further embodiment of the invention, FIG. 11: a further embodiment of the invention, FIG. 12: a further embodiment of the invention, in top view, FIG. 13: a further embodiment of the invention and variants thereof, FIG. 14: a further embodiment of the invention, FIG. 15: an embodiment of the invention in which the carrier is mounted to a trolley, and a variant thereof, FIG. 16: an embodiment of the invention comprising a processing station, FIG. 17-41: further embodiments of the invention.

FIG. 1 shows an example of a system for processing a carcass part of a quadruped slaughter animal.

The system of FIG. 1 shows an overhead conveyor 10 with a plurality of carrier assemblies 50. The carrier assemblies 50 are arranged below a track 11 that follows a path along several processing stations 15. Each carrier assembly 50 comprises a carrier and a trolley. The carrier engages a carcass or carcass part 1, while the trolley is driven such that it runs over the track 11. In the example of FIG. 1 a drive chain 12 extends below the track 11. The drive chain 12 connects the carrier assemblies 50 with each other and with a driver. In the example of FIG. 1, adjacent carrier assemblies have a fixed distance to each other which is generally indicated as "pitch". Instead of a drive chain 12, for example a drive cable could be used.

In the system of FIG. 1, each carrier is connected to one or more trolleys, such that the drive system moves the carriers along the path by driving the trolleys.

The carcasses or carcass parts 1 are supplied to the system by a supply conveyor 14 to an in-feed station 16. At the in-feed station 16, each carcass or carcass part 1 is arranged in a carrier assembly 50, which transports the carcass or carcass part 1 along the track 11 so that it passes along the processing stations 15.

In the processing stations 15, processing steps are carried out. A processing step may for example be the removal of skin, rind and/or fat, making a cut at a certain location or removing a piece of meat or a bone. In the system of FIG. 1, for example pieces of meat that are removed are transported away by means of wheeled containers 17 and/or conveyor belts 18.

In the example of FIG. 1, the processing steps are carried out manually in the in processing stations 15. As an alternative, one or more processing stations 15 may be automatic or semi-automatic processing stations, in which at least one processing step is carried out automatically or semi-automatically, by a machine rather that by an operator. For example, such an automatic or semi-automatic processing station could comprise an automatic cutter that makes a cut on the carcasses or carcass parts that pass through the processing station.

The system according to the invention, in particular the carrier according to the invention, is suitable for use for example in a system according to FIG. 1.

FIG. 2 shows a first embodiment of a carrier 20 according to the invention.

The carrier 20 has a first jaw element 21 which has an engagement face 22 and a second jaw element 23 which has an engagement face 24. In use, the carcass or carcass part is clamped between the engagement faces 22,24.

The first and second jaw elements 21, 23, define a holding slot 25 between them. In use, a part of a carcass or carcass part will be arranged in the holding slot such that the carrier 20 can retain the carcass or carcass part.

The holding slot 25 has a retaining part 26. The retaining part 26 is the part of the holding slot 25 in which the carcass or carcass part is actually retained in use, e.g. during transport of the carcass or carcass part along the track of an overhead conveyor. The engagement faces 22,24 define opposite walls of the retaining part 26 of the holding slot 25.

The holding slot 25 further comprises an entrance portion 27 for receiving a part of the carcass or carcass part when the carcass or carcass part is introduced into or removed from the holding slot 25 of the carrier 20. When a carcass or carcass part is arranged in the carrier, it enters the holding slot 25 via the entrance portion 27. From the entrance portion 27, it is displaced into the retaining part 26 where it is clamped between the engagement faces 22, 24.

The first jaw element 21 and the second jaw element 23 are moveable relative to each other such that the width of the retaining part 26 of the holding slot 25 can be varied over a width range between a minimum width and a maximum width. So, it is possible that the jaw elements assume a relative position such that the width of the retaining part of the holding slot is somewhere between the minimum width and the maximum width.

In the embodiment of FIG. 2, the first jaw element 21 and the second jaw element 23 are connected to each other by means of a hinge 30 with a hinge pin 32 such that they can pivot relative to each other in order to vary the width of the retaining part 26 of the holding slot 25. Alternatively, instead of a hinge, a guide can be present to guide the relative movement of the first and second jaw element 21,23 along a predetermined path. Such a guide could be for example a slide, which makes the jaw elements 21,23 perform a movement along a defined straight or curved line relative to each other. As an other alternative, there may be no provisions to define the path of the relative movement of the jaw elements 21,23.

In the embodiment of FIG. 2, the jaw elements 21,23 are jaw plates. They are for example made out of sheet material that is cut in the desired shape, and preferably the edges are rounded. When the engagement faces are rounded or at least comprise rounded edges, the carcass or carcass part is less or not at all damaged by the engagement faces when it is clamped between the engagement faces. Alternatively, the jaw elements could be manufactured in another way, e.g. by casting or milling.

In the embodiment of FIG. 2, the carrier 20 further comprises a tensioning structure 39 in the form of an elastic bar 40. The elastic bar 40 extends between the first jaw element 21 and the second jaw element 23. The elastic bar 40 has a first end 41 and a second end 42, which second end 42 is opposite the first end 41. The first end 41 of the elastic bar 40 is connected to the first jaw element 21. The second end 42 of the elastic bar 40 is connected to the second jaw element 23.

In an alternative to the embodiment shown in FIG. 2, the carrier 20 does not comprise a hinge 30 or guide that controls the relative movement of the first and second jaw element 21, 23. In such an embodiment, the elastic bar could be the only connection between the first and the second jaw plate 21,23. It is possible that the elastic bar 40 has zones with different elasticity.

In the embodiment of FIG. 2, the elastic bar 40 is a curved rod with a generally circular cross section. The diameter of the rod is generally constant over the length of the rod. However, alternative designs of the elastic bar are possible. For example, the bar can have areas of different cross sectional dimension or shape, resulting in different elasticities. This makes that the deformation of the bar that is induced by relative movement of the jaw elements 21,23 mainly takes place in defined areas of the elastic bar, in particular in the areas that have a relatively high elasticity. In an other alternative design, the elastic bar comprises one or more leaf springs, or the elastic bar is a leaf spring, or the elastic bar has a cross section other than circular, such as square, rectangular, oval, octagonal or hexagonal.

Such alternative designs of the elastic bar may be used in the embodiment of FIG. 2, but also in the other embodiments disclosed in this application.

In a possible embodiment of the carrier shown in FIG. 2, the elastic bar 40 provides a pre-tensioning force to the carrier of FIG. 2. This pre-tensioning force biases the first and second jaw element towards each other and therewith contributes to the force for clamping the carcass or carcass part between the engagement faces 22,24 of the jaw elements 21,23.

The pre-tensioning force further has the effect that a threshold force has to be overcome to move the first and/or second jaw element away from each other. This assists in reliable clamping of the carcass or carcass part in the holding slot of the carrier.

In a possible embodiment of the carrier of FIG. 2, the pre-tensioning force can be obtained by in fabrication, bending the elastic bar 40 such that the first end 41 and second end 42 are closer together than they will be when mounted to the jaw elements 21,23. When attached to the jaw elements 21,23, the elastic bar 40 will have a tendency to return to its stressless "as manufactured"-state, with the first end 41 and second end 42 being pushed towards each other.

An abutment 31 could be provided to prevent that the retaining part 26 of the holding slot 25 becomes too narrow when no carcass or carcass part is arranged in the retaining part 26 of the holding slot 25.

In the embodiment of FIG. 2, the first end 41 of the elastic bar 40 is connected rigidly to the first jaw element 21 and the second end 42 of the elastic bar 40 is connected rigidly to the second jaw element 23. This causes the elastic bar 40 to be subjected to both torsion and bending when the first and second jaw element 21,23 move relative to each other.

In an alternative embodiment of the carrier of FIG. 2, the connection between the first end 41 of the elastic bar 40 and the first jaw element 21 and/or the connection between the second end 42 of the elastic bar 40 and the second jaw element 23 is/are such that relative movement, in particular relative rotation, between the respective end 41,42 of the elastic bar 40 and the respective jaw element 21,23 is possible. This reduces or even eliminates the torsion in the elastic bar 40 and therewith reduces the total mechanical stress that is exerted on the elastic bar 40.

FIG. 3 shows a variant of the embodiment of FIG. 2. In the embodiment of FIG. 2, the first jaw element 21 has a different shape than the second jaw element 23, which results in an asymmetric shape of the holding slot 25, in particular of the entrance portion 27 thereof. In certain embodiments of the system according to the invention, such an symmetric entrance portion 27 could facilitate the introduction of a carcass or carcass part into the holding slot 25 of the carrier 20.

In the variant of FIG. 3, the shape of the first jaw element 21 is a mirror image of the shape of the second jaw element 23. This results in a symmetrical holding slot 25.

An advantage of the variant of FIG. 3 is that the first jaw element 21 and the second jaw element 23 can be manufactured as identical parts. Upon assembly, one of the jaw elements is simply flipped over such that the embodiment of FIG. 3 can be obtained.

The advantage of this embodiment is that less spare parts have to be kept in stock and storage of spare parts and manufacturing is cheaper and simpler. Also, the logistics of the spare parts is easier.

FIG. 4A shows an example of a carcass part 1 arranged in a carrier according to the invention. In the example of FIG. 4, the carcass part is a leg part of a pig, which in this case still comprises the foot 2.

In the example of FIG. 4A, the holding slot of the carrier 20 is adapted to receive a pig foot. The dimensions of the holding slot 25 and the minimum and maximum width are chosen such that the carrier 20 is able to handle the likely range of natural variations that occur in these carcass parts.

Engagement faces 22,24 of the jaw elements 21,23 preferably engage the carcass part in the area of the lateral metatarsal bones or the metacarpal bones. In that case, the width of the holding slot 25 is preferably adapted such that the lateral metatarsal or metacarpal bones in the pig foot are pressed from their natural position to a position closer to the engagement face of the first or the second jaw element, as is described in WO2011/074966.

The features of FIG. 4A may be applied in all embodiments of the carrier disclosed in this application.

The embodiment of FIG. 4A can be modified such that it is suitable for carcasses or carcass parts of other animals, such as ovine, caprine or bovine animals. Some of these animals have a single bone in the metatarsal or metacarpal area and no or only rudimentary dewclaws, but it is still advantageous to engage the carcass or carcass part in this area. Alternatively, the carcass part is engaged in the region of the phalanx. In that case, preferably the phalanx are pressed from their natural position to a position closer to the engagement face of the first or the second jaw element.

FIGS. 4B, 4C and 4D show details of the bone structure of a pig legs.

FIG. 4B shows the bone structure of a front leg of a pig, while FIG. 4C shows the bone structure of a hind leg of a pig. FIG. 4B shows the scapula (shoulder blade) 511, humerus 512, radius 513, ulna 514 and olecranon 515. FIG. 4C shows the femur 517, the tibia 519 and the fibula 520.

FIG. 4D shows the bone structure of the foot of a pig. The structure is basically the same for the front and hind leg. As is known a pigs foot contains four digits. The central digits, indicated with MC3 and MC4 are functional and basically bear the load of the pig, whereas the lateral digits MC2 and MC5 are basically non-functional. In pigs the latter are referred to as dewclaws. The references MC2, MC3, MC4 and MC5 refer to metacarpal or metatarsal bones of the pig foot.

In FIG. 4D the references P1, P2, P3 refer to phalanges of the pig's foot.

FIG. 4B and FIG. 4C show the central metatarsal or metacarpal bones 522 and the lateral metatarsal or metacarpal bones 523.

In FIG. 4D the reference H indicates a region of the foot of the pig that is advantageously arranged in the retaining part 26 of the holding slot 25. This region includes metatarsal or metacarpal bones 522 and 523 of the foot.

There are several advantages to clamping this region of the pigs foot between the engagement faces 22,24 of the jaw elements. A first advantage is that the diameter of this region is about the same for a front leg and for a hind leg. This allows to use the same carrier for engaging an individual front leg part as well as an individual hind leg part of a pig. This means that hams and fore-ends can be held by the same carrier, so the same carrier can be used for both.

A second advantage of using this region of the foot as a holding zone is illustrated in FIG. 4E and FIG. 4F.

FIG. 4E shows a cross section through a pig's foot in the area of the metatarsal or metacarpal bones 522 and 523, so in the region H as indicated in FIG. 4D. The cross section as shown in FIG. 4E is generally the same for a front leg or a hind leg.

FIG. 4E shows the pig's foot in natural state, before they are arranged in the carrier according to the invention. As can be seen the lateral metatarsal or metacarpal bones 522 are situated adjacent to the main phalanges 523 in the natural position as shown in FIG. 4E. A relatively large tendon 524 runs through the cross section. The outside layer 525 of the cross section comprises skin, rind and a bit of fat. Around the tendon 524 and the metatarsal or metacarpal bones 522,523, mainly meat 526 is present.

So, in the cross section of the holding zone as shown in FIG. 4E, the metatarsal or metacarpal bones 522,523; the soft tissue surrounding the bone comprises skin, rind and fat 525, tendon 524 and meat 526 are present.

Tests have shown that deforming the foot in the region of the metatarsal or metacarpal bones by applying pressure in the direction of arrows A requires quite a lot of force. This is basically when the pressure is applied in lateral direction on the foot. On the other hand, when pressure is applied in the direction of arrows B, that is generally pressing the front side and the rear side of the foot towards one another, this region of the foot is much easier to deform; it requires less force to obtain a certain deformation and the ultimate deformation that can be achieved is larger.

Use of this knowledge can be made when choosing a minimum width, maximum width and/or elasticity of the tensioning structure for the carrier according to the invention.

When the pig foot is clamped in the retaining part 26 of the holding slot 25, and the retaining part 26 of the holding slot 25 is narrower than the undisturbed cross-section of the pig foot region received therein, the lateral metatarsal or metacarpal bones 523 will be pressed towards the central metatarsal or metacarpal bones 522 and also towards the engagement face 22 of the jaw element 21. This is shown in FIG. 4F. This clamping of the pig foot provides a reliable suspension of a leg part of the pig, e.g. up to a weight of 15 kg.

As explained the sideways introduction of the pig foot into the slot in this orientation will require a limited force as compression of the pig foot in the direction perpendicular to the introduction direction is relatively easy. This e.g. allows for manual introduction of the pig foot into the holding slot 25.

In FIG. 4E and FIG. 4F, the central metatarsal or metacarpal bones 522 are shown as a single bone. In a pig's foot, the tops of the two central metatarsal and metacarpal bones 522 are fused together so that they have become connected to each other, in particular in adult animals. This can be seen in FIG. 4D. FIG. 4E and FIG. 4F show the situation where the pig foot is arranged in the retaining part 26 of the holding slot 25 in the area where the tops of the metatarsal or metacarpal bones have fused.

However, lower in the region H, more towards the free end of the pig's foot, the central metatarsal or metacarpal bones 522 are spaced apart from each other. This can also be seen in FIG. 4D.

FIG. 4E* shows a cross section of the pig's foot in the part of region H where the metatarsal or metacarpal bones 522 are spaced apart from each other. FIG. 4E* shows the natural state of the pig's foot.

FIG. 4F* shows the pig's foot arranged in a carrier according to the invention, wherein the cross section that is shown in FIG. 4E* is arranged in the retaining part 26 of the holding slot 25 and clamped between the jaw elements 21, 23. In FIG. 4F*, the lateral metatarsal or metacarpal bones 523 will be pressed towards the central metatarsal or metacarpal bones 522 and also towards the engagement face 24 of the jaw element 23. Alternatively, the pig's foot could be introduced in the retaining part 26 of the holding slot 25 in such a way that the lateral metatarsal or metacarpal bones 523 will be pressed towards the central metatarsal or metacarpal bones 522 and also towards the engagement face 22 of the jaw element 21.

FIG. 4G shows the skeleton of a goat, indicating the scapula 511, the humerus 512, the radius 513, the tibia 519 and the femur 517.

Like fin FIG. 4D, H indicates the part of the carcass or carcass part that is advantageously arranged in the retaining part 26 of the holding slot 25.

FIG. 4H shows the skeleton of a sheep, indicating the scapula 511, the humerus 512, the radius 513, the tibia 519 and the femur 517.

Like fin FIG. 4D, H indicates the part of the carcass or carcass part that is advantageously arranged in the retaining part 26 of the holding slot 25.

FIG. 4I shows the skeleton of a cow, indicating the scapula 511, the humerus 512, the radius 513, the tibia 519 and the femur 517.

Like fin FIG. 4D, H indicates the part of the carcass or carcass part that is advantageously arranged in the retaining part 26 of the holding slot 25.

FIG. 5 shows a further embodiment of a carrier according to the invention.

In the embodiment of FIG. 5, again the tensioning structure 39 is formed by a single elastic bar 40. The connections between the elastic bar 40 and the respective jaw elements 21,23 are located closer to the hinge 30 than in the embodiment of e.g. FIG. 2. By this arrangement, the deformation of the elastic bar 40 will be less than in the embodiment of FIG. 2, and therewith the mechanical stress in the elastic bar 40 is reduced. This increases the fatigue life of the elastic bar 40.

Practice has shown that for carriers that are used for carcasses or carcass parts of pigs, or carriers of similar size, it is advantageous if the distance between the hinge 30 and the connection between the at east partially elastic bar 40 and a jaw element 21,23 is 5 cm or less, preferably 3.5 cm or less. In general, the optimal distance depends on the size of the carrier, on the size and/or weight of the carcass or carcass part for which the carrier is used, and on the desired clamping force.

In the embodiment of FIG. 5, the elastic bar 40 has a curve 43 forwards, towards the entrance portion of the holding slot. Depending on the position of the connection between the ends 41,42 of the elastic bar 40 and the respective jaw elements 21,23, such an additional curve can help to achieve that in use, the jaw elements 21,23 extend substantially horizontally.

This applies in particular for those cases wherein the carrier 20 is pivotably connected to a trolley at central part 44 of the elastic bar 40, examples of which are shown in FIGS. 11 and 14. By arranging the central part 44 substantially straight above the area where the center of gravity of the combination of the carrier and the carcass or carcass part it retains can be expected, the jaw elements 21,23 will be substantially horizontal in use.

Having the jaw elements 21,23 extend substantially horizontally in use helps to retain the carcass or carcass part in the holding slot 25 of the carrier 20.

FIG. 5A shows a variant of the embodiment of FIG. 5. In the embodiment of FIG. 5A, the jaw elements 21, 23 have a slightly different shape than in FIG. 5. The jaw elements 21, 23 have been provided with rounded protrusions 33 that locally narrow the holding slot 25 between the entrance part 27 and the holding part 26. These protrusions 33 provide additional security against undesired release of the carcass part from the carrier.

Jaw elements 21,23 of the type shown in FIG. 5A can be used in any of the disclosed embodiments.

In the variant of FIG. 5A, both jaw elements 21,23 are provided with a protrusion 33. Alternatively, only one jaw element can be provided with such a protrusion 33.

FIG. 6 shows several variations of the elastic bar 40. Any of these variations can be used in any of the disclosed embodiments of the carrier according to the invention. In all these variations, the elastic bar 40 forms the tensioning structure.

FIG. 6A-C show side views of the respective embodiments. In these side views, the entrance portion of the holding slot is on the left hand side of the figure. For clarity reasons, a hinge 30 has been indicated in these three embodiments. However, the elastic bars 40 shown in FIG. 6A-C can also be applied in embodiments that do not have a hinge.

FIG. 6A shows an embodiment in which the elastic bar 40 is arranged significantly in front of the hinge 30. The elastic bar 40 is at an angle of about 90° relative to the second jaw element 23 (and also to the first jaw element 21). Preferably, the position of the elastic bar 40 is chosen such that the central part 44 is located substantially straight above the centre of gravity of the combination of the carrier and the carcass or carcass part it holds in use.

In the embodiment of FIG. 6B, the elastic bar 40 is connected further to the back of the jaw elements 23,21, that is further away from the entrance portion of the holding slot. The elastic bar 40 has a curve 43 in order to bring the central part 44 substantially straight above the centre of gravity of the combination of the carrier and the carcass or carcass part it holds in use.

In the embodiment of FIG. 6C, the elastic bar 40 is also arranged more towards the back of the jaw elements 23,21. It is now however arranged at an angle relative to the jaw elements 21,23 in order to arrange the central part 44 substantially straight above the centre of gravity of the combination of the carrier and the carcass or carcass part it holds in use.

FIG. 6D-F show front views of the respective embodiments. In these front views, the entrance portion of the holding slot is directed towards the viewer. No hinge or other guide has been indicated in these three embodiments. However, the elastic bars 40 shown in FIG. 6D-F can also be applied in embodiments that have a hinge, a slide or some other kind of guide for the relative movement of the jaw elements 21,23.

In the embodiment of FIG. 6D, the elastic bar 40 is generally U-shaped, but instead of having two bends with a relatively small radius and a straight central part 44 there between as shown for example in FIG. 2, the elastic bar 40 of FIG. 6D has single bend with a relatively large radius. In the embodiment of FIG. 6D, the central part 44 of the elastic bar 40 is curved, with its radius of curvature being substantially constant.

In the embodiment of FIG. 6E, the central part 44 of the elastic bar 40 has a smaller diameter than the rest of the elastic bar 40. The central part 44 thus has a different elasticity than the rest of the elastic bar 40. The deformation due to the relative movement of the jaw elements 21,23 will be concentrated in the central part 44 of the elastic bar 40.

In the embodiment of FIG. 6F, side parts 45 of the elastic bar 40 have a smaller diameter than the rest of the elastic bar 40. Therewith the side parts 45 have a different elasticity than the rest of the elastic bar 40. The deformation due to the relative movement of the jaw elements 21,23 will be concentrated in the side parts 45 of the elastic bar 40.

FIG. 7 shows a further embodiment of a carrier according to the invention, viewed from below.

In the embodiment of FIG. 7, the first jaw element 21 has been provided with a lip 35. The second jaw element has been provided with a recess 36. The lip 35 falls within the recess 36. The recess 36 is larger than the lip 35 such that the lip can move within the recess 36 when the first jaw element 21 and the second jaw element 23 move relative to each other.

However, the walls 37 and 38 of the recess 36 limit the movement op the lip 35. Therewith, they also limit the movement of the jaw elements 21,23 relative to each other. Wall 38 prevents the retaining part 26 of the holding slot 25 becoming too narrow. Wall 37 prevents the retaining part 26 of the holding slot 25 becoming too wide. Therewith, wall 37 prevents overstretching of the elastic bar. This minimizes or even prevents plastic deformation and low cycle fatigue of the elastic bar 40.

In the embodiment of FIG. 7, the elastic bar 40 is pivotably connected to the jaw elements 21,23 by pivots 46. However, the lip 35 and recess 36 can also be used in combination with the other embodiments of the carrier, e.g in those embodiments in which the elastic bar 40 is rigidly connected to the jaw elements 21,23.

In the embodiment of FIG. 7, the shapes of the engagements faces 22,24 of the first and second jaw element 21,23 respectively, are mirror images of each other. However, the lip 35 and recess 36 may also be used in combination with the other embodiments of the carrier.

FIG. 8 shows a further embodiment of the invention. In the embodiment of FIG. 8, the first jaw element 21 has been provided with a slit 60. The second jaw element 23 has been provided with two pins 61, that protrude through the slit 60.

When the first and second jaw element 21,23 move relative to each other, the pins 61 move in the slit 60. This way, they make that the first and second jaw element 21,23 move in a straight line or a curved line relative to each other, depending on the shape of the slit. The combination of the two pins 61 and the slit 60 guides the relative movement of the jaw elements 21,23. Relative rotation is prevented.

In an alternative embodiment, there is only one pin 61 instead of two. In that case, relative rotation of the first and second jaw element 21,23 is possible, and the translating movement is still guided.

In the embodiment of FIG. 8, the jaw elements 21,23 are able to move relative to each other a little in the direction perpendicular to the plane in which the jaw elements 21,23 extend. The connection between the jaw elements 21,23 can alternatively be configured such that no movement in the direction perpendicular to the plane in which the jaw elements 21,23 extend is possible.

In general, it is advantageous if the engagement faces of the jaw elements engage the carcass or carcass part at at least substantially the same height, so directly opposite each other on either side of the carcass or carcass part. This prevents undesirable tilting of the carcass or carcass part in the carrier.

FIG. 9 shows a further embodiment of the invention. In the embodiment of FIG. 9, the hinge 30 between the first jaw element 21 and the second jaw element 23 is an elastic hinge. In the example of FIG. 9, the elastic hinge comprises a dam 64 of material that connects the first jaw element 21 and the second jaw element 23. When the first and second jaw element 21,23 move relative to each other, the dam 64 deforms elastically, therewith providing a hinging function. The elasticity of the dam 64 will generally not be such that it provides a proper clamping force for the carcass or carcass part to be retained in the holding slot. In such cases a separate tensioning structure is still desirable.

However, there may be designs or uses in which the elastic hinge as such provides a significant part of the desired clamping force to the engagement faces of the jaw elements. In such cases, the elastic hinge forms part of the tensioning structure.

There even may be designs or uses in which the elastic hinge as such provides enough clamping force to the engagement faces of the jaw elements. In such cases, the elastic hinge forms the tensioning structure.

The elastic hinge may be applied in all embodiments of the carrier in which is hinge is present between the first and second jaw element 21,23.

In the embodiment of FIG. 9, each jaw element 21,23 is provided with a protrusion 65. The two protrusions abut against each other when the retaining part of the holding slot 25 has the minimum width. The protrusions 65 prevent that the retaining part of the holding slot 25 becomes too narrow.

In the embodiment shown in FIG. 9, the first and second jaw element 21,23 may be made together out of a single piece of material, for example by laser cutting or water jet cutting of a metal sheet.

In the embodiment of FIG. 9, the tensioning structure comprises a tension rod 40*. It can be made of a metal (e.g. spring steel, stainless steel or stainless spring steel), but alternatively, it can be made of an engineering plastic (with or without reinforcement, such as carbon fibres) or rubber.

The tension rod 40* has a first end and a second end on opposite sides, and each of those two ends is provided with an eye 47. On each jaw element 21,23 a support 48 is present. Each eye 47 receives a support 48. This ensures that even when the first and second jaw element 21,23 rotate relative to each other, the tension rod remains subjected to tensile forces only. So, in this embodiment, the tensioning structure 39 comprises the tension rod 40* with the eyes and the supports. In use, the tension rod will deform when the jaw elements 21,23 move relative to each other, and the supports will not, or at least a lot less. The supports in this embodiment therefore act as rigid or semi-rigid elements in the tensioning structure 39.

The tensioning structure with the tension rod 40* may be applied in all disclosed embodiments of the carrier according to the invention, either alone or in combination with an other tensioning structure.

In some embodiments of the invention, a trolley of and overhead conveyor or other type of conveyor may be connected to the tensioning structure. In the embodiment of FIG. 9, for example the supports 48 can so long that they extend above the tension rod 40*, and a trolley can then be connected to these supports. Alternatively, the trolley can be connected to the tension rod 40* itself. In that case, it is advantageous if the tension rod 40* is arranged at some distance from the jaw elements 21,23.

FIG. 10 shows a further embodiment of the invention. In the embodiment of FIG. 10, an elastic hinge 30 comprising elastic dam 64 is shown that connects the first and second jaw element 21,23, but other embodiments are possible.

In the embodiment of FIG. 10, the second jaw element 23 has been provided with two abutments 67. The first jaw element 21 has two adjuster supports 66, through which an adjuster screw 68,69 is arranged. The adjuster screws 68.69 are on opposite sides of the hinge 30. By setting the position of the adjuster screws 68,69 relative to the adjuster supports 66 and the abutments 67, the minimum and maximum width of the retaining part 26 of the holding slot 25 are set. The first adjuster screw 68 determines the minimum width and the second adjuster screw 69 determines the maximum width. When the first and second jaw elements 21,23 move relative to each other, the end of the first adjuster screw 68 will engage an abutment 67 on the second jaw element 23 when the minimum width of the retaining part 26 of the holding slot 25 is reached. The end of the second adjuster screw 69 will engage an abutment 67 on the second jaw element 23 when the maximum width of the retaining part 26 of the holding slot 25 is reached.

The adjuster screws 68,69 allow the minimum width and the maximum width to be set to a desired value.

The arrangement that allows the setting and adjustment of the minimum and maximum width that is shown in FIG. 10 can also be applied in combination with the other embodiments of the carrier according to the invention.

FIG. 11 shows a further embodiment of the invention.

In the embodiment of FIG. 11, the carrier 20 is pivotably connected to a trolley, which is schematically indicated by reference number 75. The trolley runs along a track 11 of an overhead conveyor, which track 11 is shown in cross section in FIG. 11. The carrier in FIG. 11 could be any of the carrier embodiments disclosed in this application.

In the embodiment of FIG. 11, the carrier 20 has been provided with a control element for controlling the position and/or orientation of the carrier 20 relative to the track 11.

In the embodiment of FIG. 11, the control element is a cam roller 71. The cam roller 71 is mounted to one of the jaw elements by means of cam roller support 72.

The embodiment of FIG. 11 further comprises a stationary guide 73, which is arranged adjacent to at least a part of the track 11. In the embodiment of FIG. 11, the stationary guide has been provided with a cam track 74. The stationary guide 73 is arranged relative to the track 11 such that the cam roller 71 of the carrier runs in and cooperates with the cam track 74 when the overhead conveyor moves the carrier 20 along the part of track 11 adjacent to which the stationary guide 73 has been arranged. The cam track 74 controls the movement of the cam roller 71 and therewith of the carrier 20. For example, the carrier is held at a predetermined angle or orientation relative to the trolley. In addition, the trolley may be equipped with an indexing mechanism, e,g, of the type shown in FIG. 15, so that the carrier 20 may also be rotated around a vertical axis.

Also in other embodiments of the carrier according to the invention, a cam roller in combination with a stationary guide can be applied. In particular, when a bracket is used as a tensioning structure, for example as shown in the embodiments of FIGS. 13 and 14, the cam roller can met mounted on the bracket.

FIG. 12 shows a further embodiment of the invention, in top view. In the embodiment of FIG. 12, the carrier 20 has been provided with a locking element 80. In the embodiment of FIG. 12, the locking element 80 is a lever. The lever is pivotable relative to the second jaw element 23 about pivot axis 81. The locking element 80 is spring loaded by means of compression spring 82.

The locking element 80 extends partially over the holding slot 25, therewith locally narrowing the holding slot 25. This helps to retain the carcass or carcass part in the holding slot 25.

A locking element can alternatively be mounted on the first jaw element instead of or in addition to a locking element mounted on the second jaw element 23.

A locking element may be applied in combination with other embodiments of the carrier according to the invention than the particular embodiment shown in FIG. 12.

FIG. 13 shows a further embodiment of a carrier 20 according to the invention.

In the embodiment of FIG. 13, the tensioning structure 39 comprises a bracket 140.

The bracket 140 in the embodiment of FIG. 13 comprises two upright legs 142a,b. One leg 142a is connected to the first jaw element 21 at connection zone 143a, the other leg 142b is connected to the second jaw element 23 at connection zone 143b. In the example of FIG. 13, the legs 142 are welded to the jaw elements 21,23 at connection zones 143a,b, but alternatively one or both of the connections could be such that the jaw element is pivotable relative to the leg of the tensioning structure. If desired, the legs of the tensioning structure are connected to the jaw elements in a releasable way.

At a distance from the jaw elements 21,23, the upright legs 142a,b are connected to each other by a connection piece in the form of cross bar 141. In the embodiment of FIG. 13, both the legs 142a,b and the cross bar 141 are bars with a substantially rectangular cross section. Alternatively, the cross section of the legs and/or the cross bar could have a different shape.

When the jaw elements 21,23 move relative to each other, the connection zone of the first leg moves along with the first jaw element and the connection zone of the second leg moves along with the second jaw element. This causes deformation of the bracket. The resistance that the bracket offers to this deformation provides the clamping force to the jaw elements for retaining the carcass or carcass part in the carrier.

In the embodiment of FIG. 13, the bracket 140 is a monolithic structure. It can be made out of a single piece or made out of strips, rods or sheet parts welded together. Preferably, the bracket does not comprise a hinge, slide or other component that allows movement of parts of the bracket relative to each other without inducing mechanical stress in the bracket. Preferably, any deformation of the bracket induced by relative movement of the jaw element induces a change in the level of material stress in the bracket.

As an additional feature, the cross bar 141 has been provided with a hole 144 to which for example a cam roller (as for example shown in FIG. 11) could be fitted. The holes 145a,b in the upright legs 142a,b may be used to connect the carrier to a trolley.

FIGS. 13A, 13B and 13C show variants of the embodiment of FIG. 13. In these variants, the connection piece, here embodied as cross bar 141, is made of a different material than the legs 142a,b of the bracket. The connection piece 141 is made of plastic, e.g. POM or PA, while the legs of the bracket are madder of stainless steel.

In the embodiment of FIG. 13A, the connection piece 141 is connected to the outside of the legs 142a,b of the bracket 140. This connection can for example be obtained by bolting the connection piece to the legs.

In the variant of FIG. 13B and FIG. 13C (FIG. 13C is a side view of the embodiment of FIG. 13B), the plastic connection piece 141 (which is again embodied as a cross bar), is connected to the inside of the legs 142a,142b.

FIG. 13B and FIG. 13C also show a cam roller 71 being connected to the connection piece 141. Such a cam roller can of course also be attached to the connection piece of e.g. the embodiment of FIG. 13 or FIG. 13A.

In the embodiments of FIG. 13A and FIG. 13B/13C, the elastic deformation will mainly take place in the connection piece 141. The legs 142a,142b will deform far less. This can be advantageous for the fatigue life of the bracket.

In the embodiment of FIG. 13B/13C, the jaw elements 21, 23 are narrowed compared e.g. to the embodiment of FIG. 13A, and the legs 142a,b are bent outwardly to connect to indexing plate 86. The narrow jaw elements 21,23 can be used in combination with all embodiments shown in this application.

In the embodiments of FIG. 13, 13A, 13B/13C, the jaw elements 21,23 are hingedly connected to each other by hinge 30. As an alternative, the jaw elements could be connected by a slide, a spring (e.g. a leaf spring) or only through the bracket.

FIG. 14 shows a further embodiment of a carrier according to the invention. FIG. 14A shows this embodiment in perspective, while FIGS. 14B and 14C show this embodiment from the bottom. In FIG. 14B, the retaining part of the holding slot 26 has its minimum width, and in FIG. 14C the retaining part 26 of the holding slot 25 has its maximum width.

In the embodiment of FIG. 14, the jaw elements 21, 23 are made of an engineering plastic, such as POM or nylon (e.g. PA6 or PA 6.6). Between the jaw elements 21,23 an elastic hinge 30 is present. The two jaw elements 21,23 and the hinge 30 are a single monolithic piece. This monolithic piece can be manufactured by injection moulding or by machining it out of a solid block of material.

The elastic hinge 30 comprises a dam 64. In the embodiment of FIG. 14, the dam 64 is S-shaped. Only the ends of the S-shape are connected to the jaw elements: one end is connected to the first jaw element 21 and the other end to the second jaw element 23. In the monolithic part that comprises the two jaw elements 21,23 and the elastic hinge 30, the only connection between the first and the second jaw element is via the S-shaped dam 64.

In the embodiment shown in FIG. 14, the tensioning structure 39 is a bracket 140 of the type shown in FIG. 13. The bracket 140 is connected to the jaw elements 21,23 by bolts 148. The bolts 148 may be tightened heavily such that the connection zones 143a,b of the bracket 140 move along in all degrees of freedom with the respective jaw element 21,23 to which they are bolted. Alternatively, the bolts 148 may be fitted rather loosely, so that the respective jaw element 21,23 to which the connection zone 143a,b is fitted can pivot relative to that connection zone 143a,b.

The bracket 140 can be connected to a trolley of an overhead conveyor system via the holes 145a,b. If desired, a cam roller can be fitted to hole 144 of cross bar 141.

In an alternative embodiment, a different type of tensioning structure can be used, for example an elastic bar. For some uses, the elastic hinge 30 will provide enough clamping force to the engagement faces of the jaw elements, so the elastic hinge 30 itself forms the tensioning structure.

FIG. 14 B shows a bottom view of the carrier of FIG. 14A when no carcass or carcass part is retained by the carrier. The bracket 140 provides a pretensioning force that biases the two jaw elements 21,23 towards each other. So, when no carcass or carcass part is arranged in the carrier, the width of the retaining part 26 of the holding slot 25 will be the minimum width.

In the embodiment of FIG. 14, each jaw element 21,23 has an inner abutment wall 28a, 28b, and an outer abutment wall 29a, 29b. The inner abutment wall 28a of first jaw element 21 faces the inner abutment wall 28b of the second jaw element 23. The outer abutment wall 29a of first jaw element 21 faces the outer abutment wall 29b of the second jaw element 23.

When the width of the retaining part 26 of the holding slot 25 is the minimum width, the inner abutment walls 28a, 28b of the jaw elements 21, 23 lie against each other. This prevents that the retaining part 26 of the holding slot 25 becomes too narrow. The outer abutment walls 29a,b are at a distance from each other in this situation. This is shown in FIG. 14B.

FIG. 14C shows the situation in which a carcass or carcass part 1 (schematically indicated in FIG. 14C) is retained by the carrier. The part or element of the carcass or carcass part that is arranged in the holding slot 25 is so large that the retaining part of the holding slot 25 has its maximum width.

In that situation, the outer abutment walls 29a, 29b of the jaw elements 21, 23 lie against each other. This prevents that the retaining part 26 of the holding slot 25 becomes too wide, and therewith it prevents over-stretching or even plastic deformation of the bracket 140. The inner abutment walls 28a,b are at a distance from each other in this situation.

FIG. 15 shows an embodiment of the invention in which the carrier 20 is mounted to a trolley 75.

In the embodiment of FIG. 15, the trolley 75 has a connection block 85 that engages the elastic bar 40. The connection is optionally such that the carrier 20 can pivot relative to the connection block 85. As the central part of the elastic bar 40 extends through the connection block 85, the central part of the elastic bar 40 will not deflect when the jaw elements 21,23 move relative to each other. Therewith, in this embodiment the bar 40 behaves like a partially elastic bar even though it has a substantially constant cross section.

In the example of FIG. 15, the trolley further comprises an indexing plate 86. The indexing plate 86 and the connection block 85 are rotatable about axis 90 relative to the other parts of the trolley 75. They have a plurality of predetermined positions in which they can be brought by an indexing mechanism that engages on the indexing plate 86. The indexing mechanism will generally be arranged adjacent to the track of an overhead conveyor onto which the trolley 75 runs.

The trolley 75 of FIG. 15 further comprises guide wheels 87 and chain clamps 88 that clamp the trolley 75 onto the drive chain of an overhead conveyor. The trolley further comprises trolley wheels 89 that run along the track of an overhead conveyor.

Any of the described embodiments of the carriers according to the invention can be connected to a trolley. For example, FIG. 15A shows a further embodiment in which a carrier similar to the carriers of FIG. 13A and FIG. 13B is connected to a trolley 75. The trolley 75 of FIG. 15A is similar to the trolley of FIG. 15, but the trolley 75 of FIG. 15A does not have the guide wheels 87 that the trolley of FIG. 15 has.

In the embodiment of FIG. 15A, the bracket 140 is hingedly connected to the trolley 75. It can pivot relative to the trolley about a horizontal axis parallel to the direction of transport of the trolley 75. A cam roller 71 is provided to control the angle of the jaw elements relative to a horizontal plane.

FIG. 16 shows an embodiment of the invention comprising a processing station 15. In this processing station 15, several operators perform at least one processing step, for example making one or more cuts, on carcass parts 1 that are moved through the processing station by means of an overhead conveyor 10 in direction of transport T.

The overhead conveyor 10 comprises a drive chain 12 that drives trolleys 75 over track 11. The trolleys 75 carry carriers 20. The carriers 20 may be of any of the carrier embodiments disclosed in this application.

The carcass parts 1 that are processed in the processing station 15 are retained in carriers 20.

FIG. 17-41 show further embodiments of the invention. Identical reference numerals indicate similar elements.

In FIG. 17 the jaw elements 21, 23 have been provided with rounded protrusions 33 that locally narrow the holding slot 25 between the entrance part 27 and the holding part 26. These protrusions 33 provide additional security against undesired release of the carcass part from the carrier. The elastic bar 40 is made of a bent rod and the ends 41,42 are connected to the jaw elements at a position in front of the hinge 30.

In the embodiment of FIG. 18 the ends 41,42 of the elastic bar 40 are connected to the jaw elements at a position in front of the hinge 30, adjacent to the holding slot 25. The jaw element 21 may be pivotable or otherwise moveable relative to the first end 41 of the elastic bar 40. The jaw element 23 may be pivotable or otherwise moveable relative to the second end 42 of the elastic bar 40. Alternatively, the ends 41, 42 are fixed relative to the respective jaw elements 21, 23.

Figure 22:
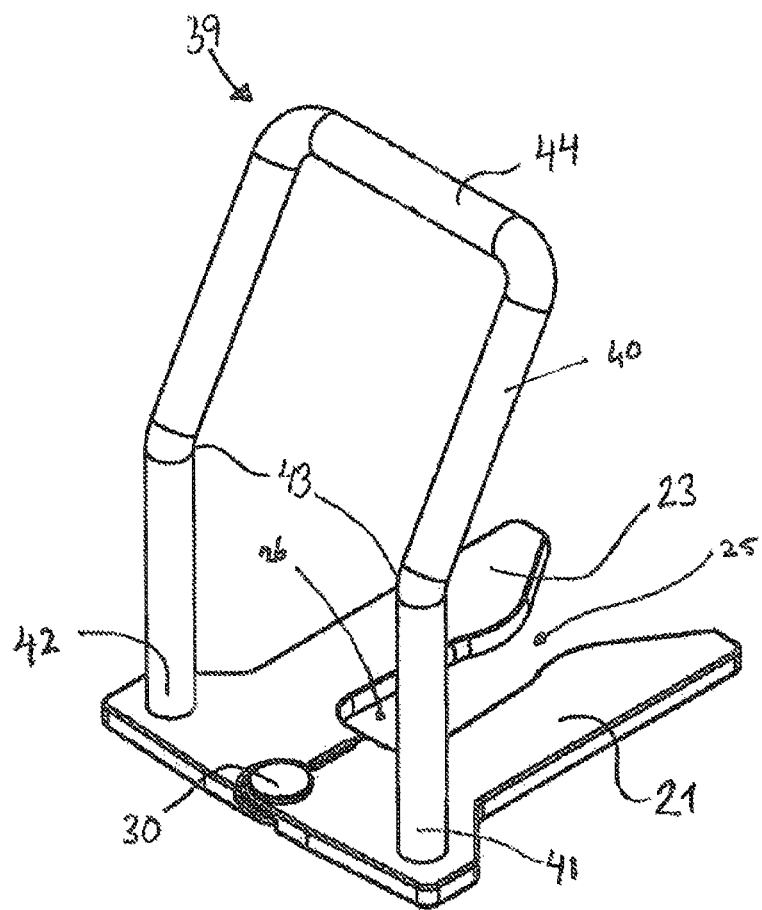

In the embodiment of FIG. 22, the elastic bar 40 is bent forward. The central part 44 of the elastic bar is arranged above the retaining part 26 of the holding slot 25. The ends 41,42 of the elastic bar are arranged just in front the hinge 30. Alternatively, they may be arranged in line with the hinge 30 (so is a straight line in drawn from the first end 41 to the second end 42, the hinge 30 is on or adjacent to this line), or just behind the hinge 30.

Figure 23:
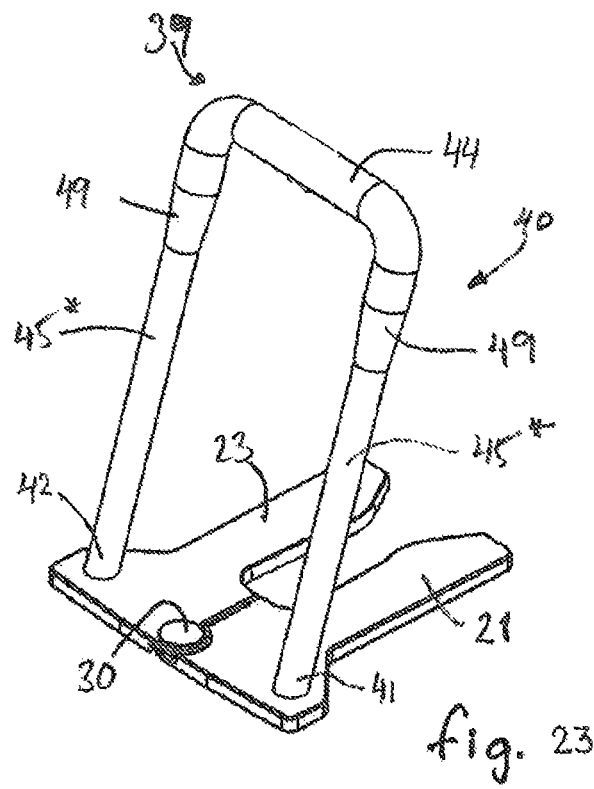
Figure 24:
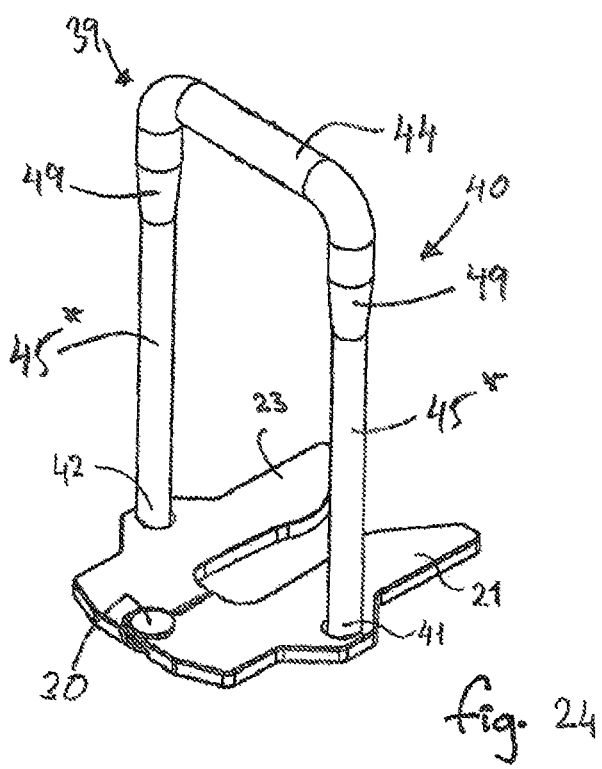

In the embodiments of FIGS. 23 and 24, the central part 44 of the elastic bar 40 has a larger diameter than the vertical parts 45* adjacent to the first and second end 41, 42. Optionally, the elastic bar 40 comprises portions 49 wherein the diameter changes gradually from the smaller diameter of the vertical parts 45* to the larger diameter of the central part 44. Optionally, those portions 49 are arranged adjacent to the central part 44.

In the embodiment of FIG. 23, the ends 41,42 of the elastic bar 40 are connected to the jaw elements at a position just in front of the hinge 30. Alternatively, they may be arranged in line with the hinge 30 or just behind the hinge 30. The elastic bar 40 is leaning forward, optionally such that the central part 44 is above the retaining part 26 of the holding slot 25.

In the embodiment of FIG. 24, the ends 41,42 of the elastic bar 40 are connected to the jaw elements at a position in front of the hinge 30, adjacent to the holding slot 25.

Figure 25:
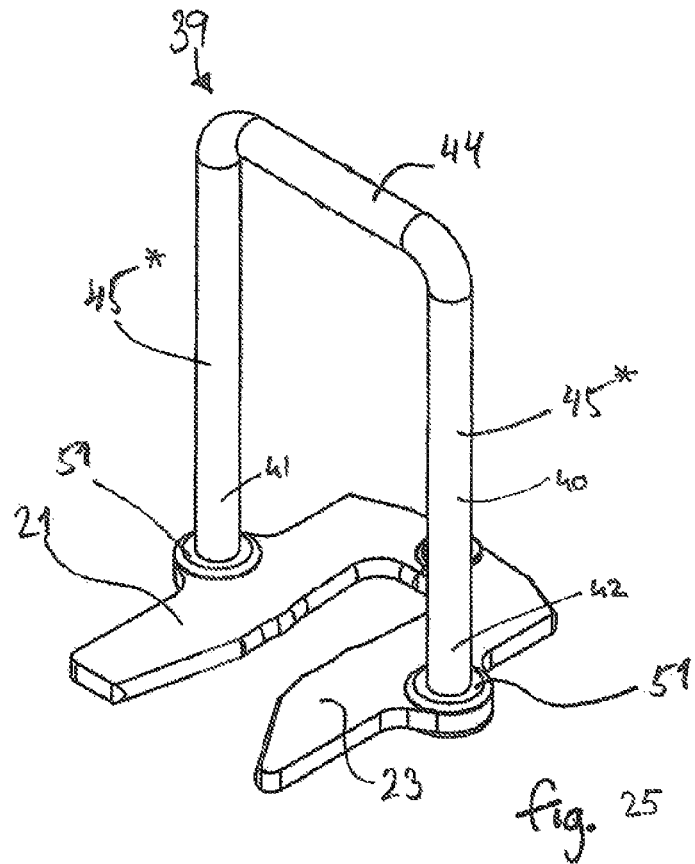

In the embodiment of FIG. 25, the jaw element 21 is pivotable relative to the first end 41 of the elastic bar 40. The jaw element 23 is pivotable relative to the second end 42 of the elastic bar 40. Bushes 51 or bearings optionally are provided to smoothen the pivoting of the ends 41,42 of the elastic bar 40 relative to the respective jaw elements 21, 23.

Figure 26:
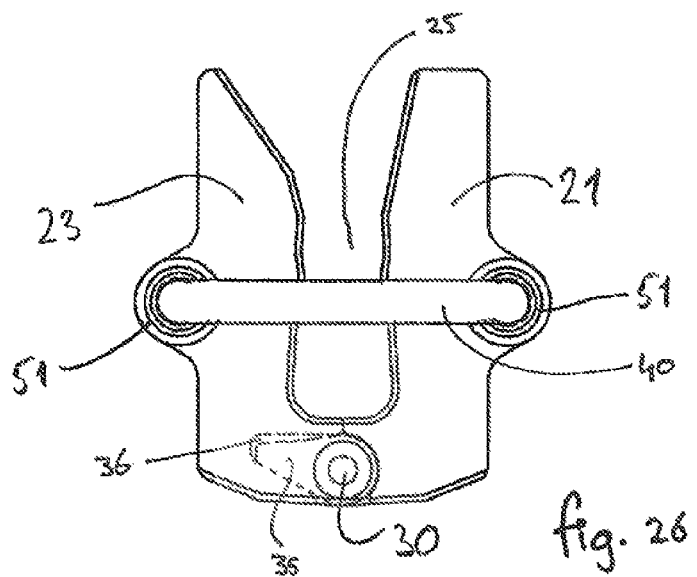

FIG. 26 shows a top view of an embodiment wherein, the jaw element 21 is pivotable relative to the first end 41 of the elastic bar 40 and jaw element 23 is pivotable relative to the second end 42 of the elastic bar 40. Bushes 51 or bearings optionally are provided to smoothen the pivoting of the ends 41,42 of the elastic bar 40 relative to the respective jaw elements 21, 23. Lip 35 in recess 36 is provided to prevent the holding slot 25 becoming to narrow or too wide.

Figure 27:
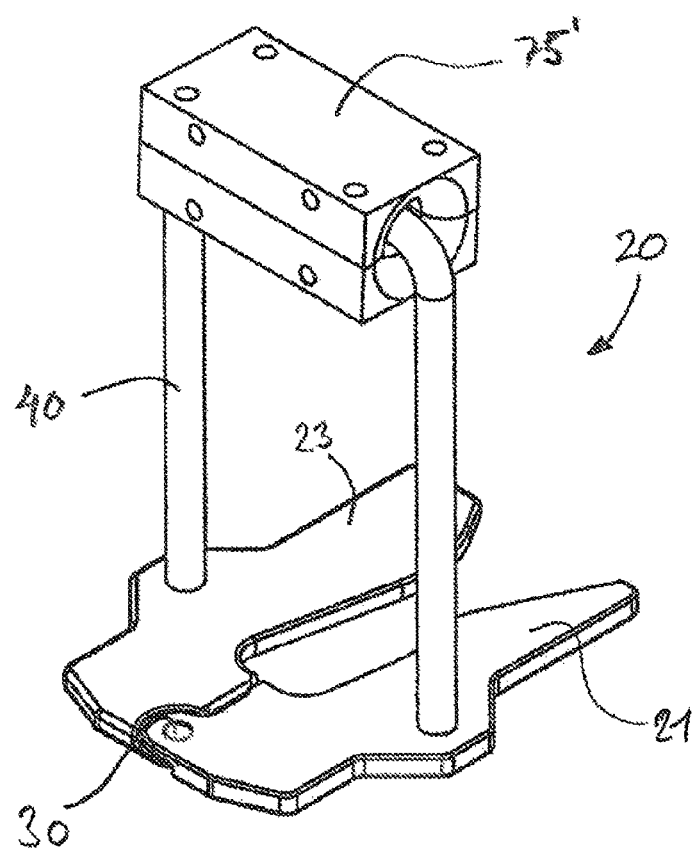

FIG. 27 shows an embodiment with an elastic bar 40 made of a bend rod with circular or substantially circular cross section. An attachment piece 75' is provided to connect the carrier to a trolley or other structure.

Figure 28:
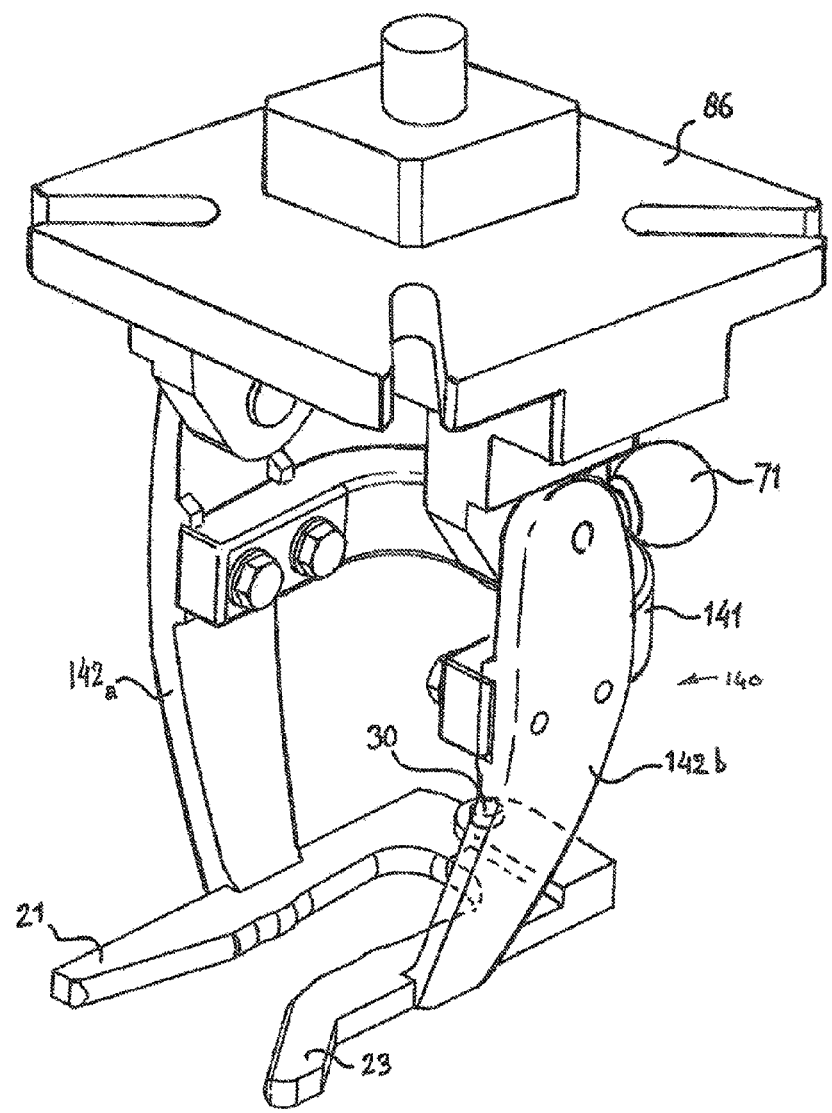

FIG. 28 shows a further embodiment. In this embodiment, the jaw elements 21,23 are relatively narrow. This allows the carriers to follow a track with tight bends and curves, in the vertical plane as well as in the horizontal plane. The cross bar 141 can be made of a plastic, preferably an engineering plastic. The cross bar 141 can be made of a polymeric plastic. The cross bar 141 is in this embodiment connected to the inside of the legs 142a, 142b of the bracket 140. Alternatively, it could be attached to the outside of those legs.

In the embodiment of FIG. 28, the carrier 20 is pivotable relative to the indexing plate 86 of the trolley (not shown). Cam follower 71 is adapted to control the relative pivoting.

Figure 29:
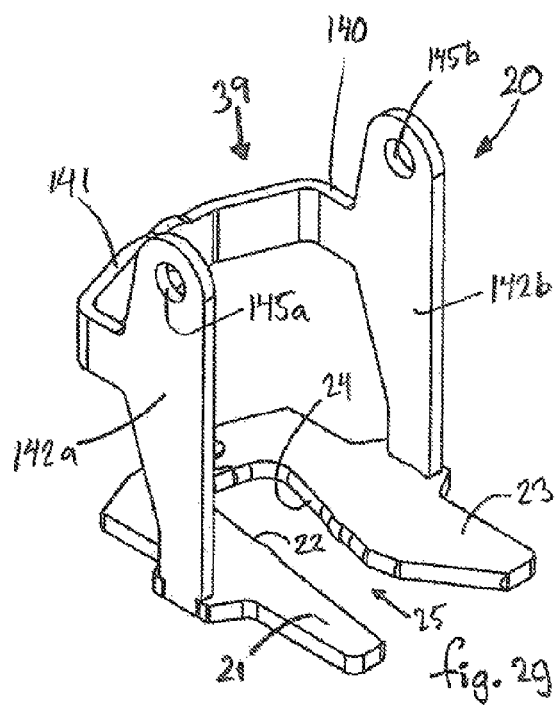

FIG. 29 shows a further embodiment of the invention.

Figure 30:
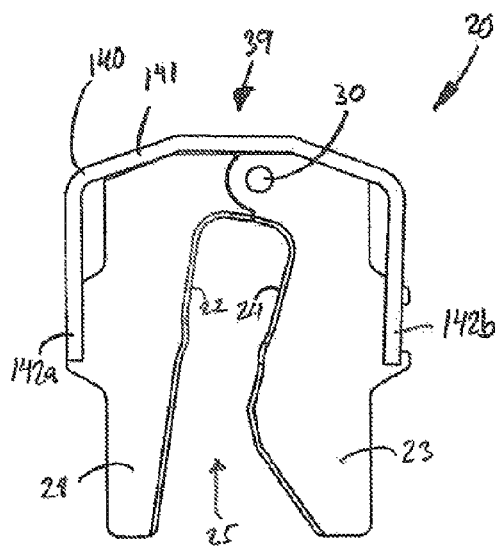

FIG. 30 shows a top view of an embodiment of the invention.

Figure 31:
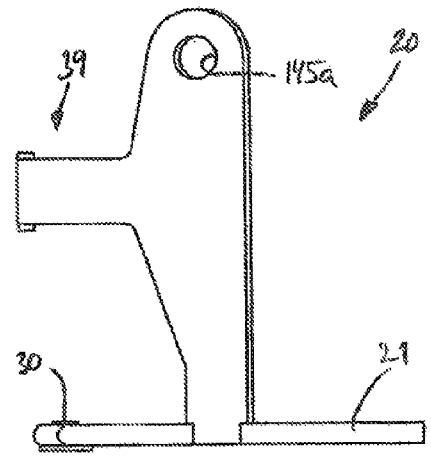

FIG. 31 shows a side view of an embodiment of the invention.

Figure 32:
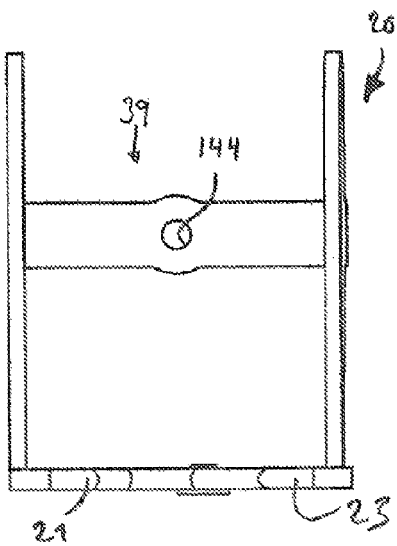

FIG. 32 shows a front view of an embodiment of the invention.

Figure 33:
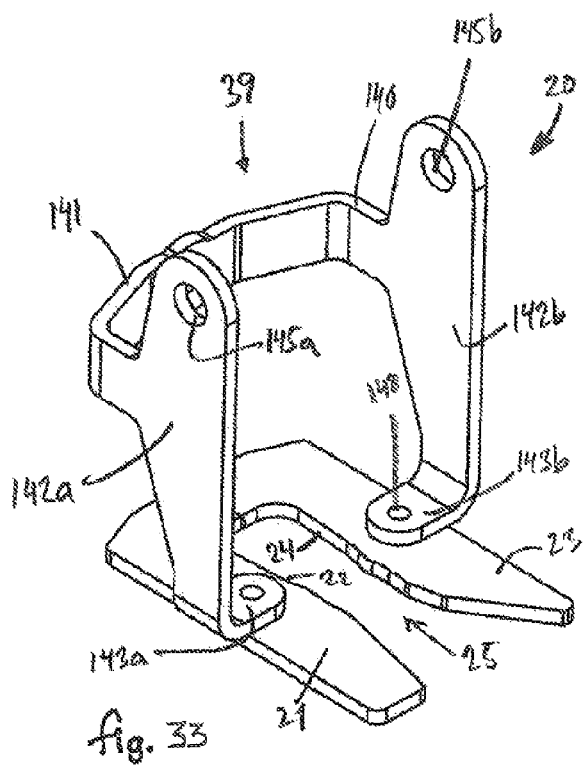

FIG. 33 shows a further embodiment of the invention. The bracket is connected to the jaw elements 21,23 by means of bolts 148.

Figure 34:
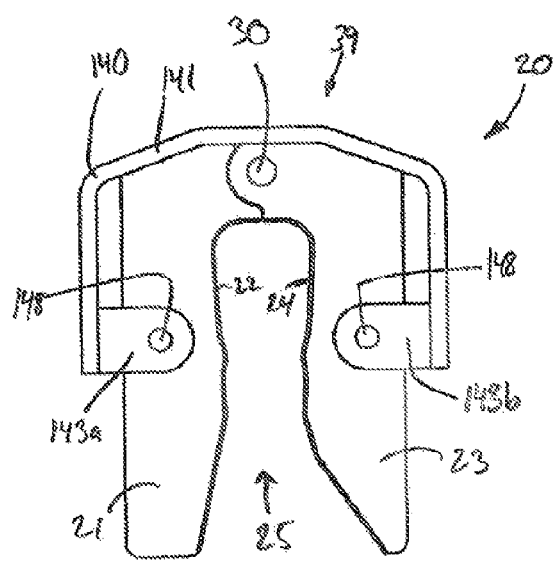

FIG. 34 shows a top view of an embodiment of the invention.

Figure 35:
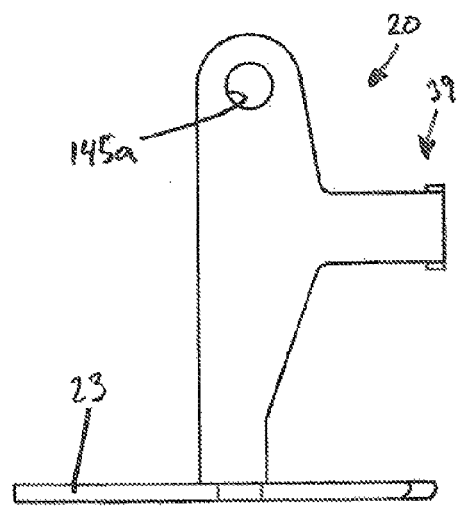

FIG. 35 shows a side view of an embodiment of the invention.

Figure 36:
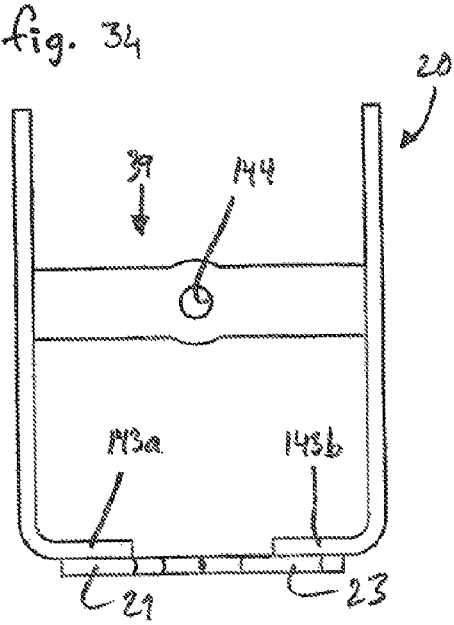

FIG. 36 shows a front view of an embodiment of the invention.

Figure 37:
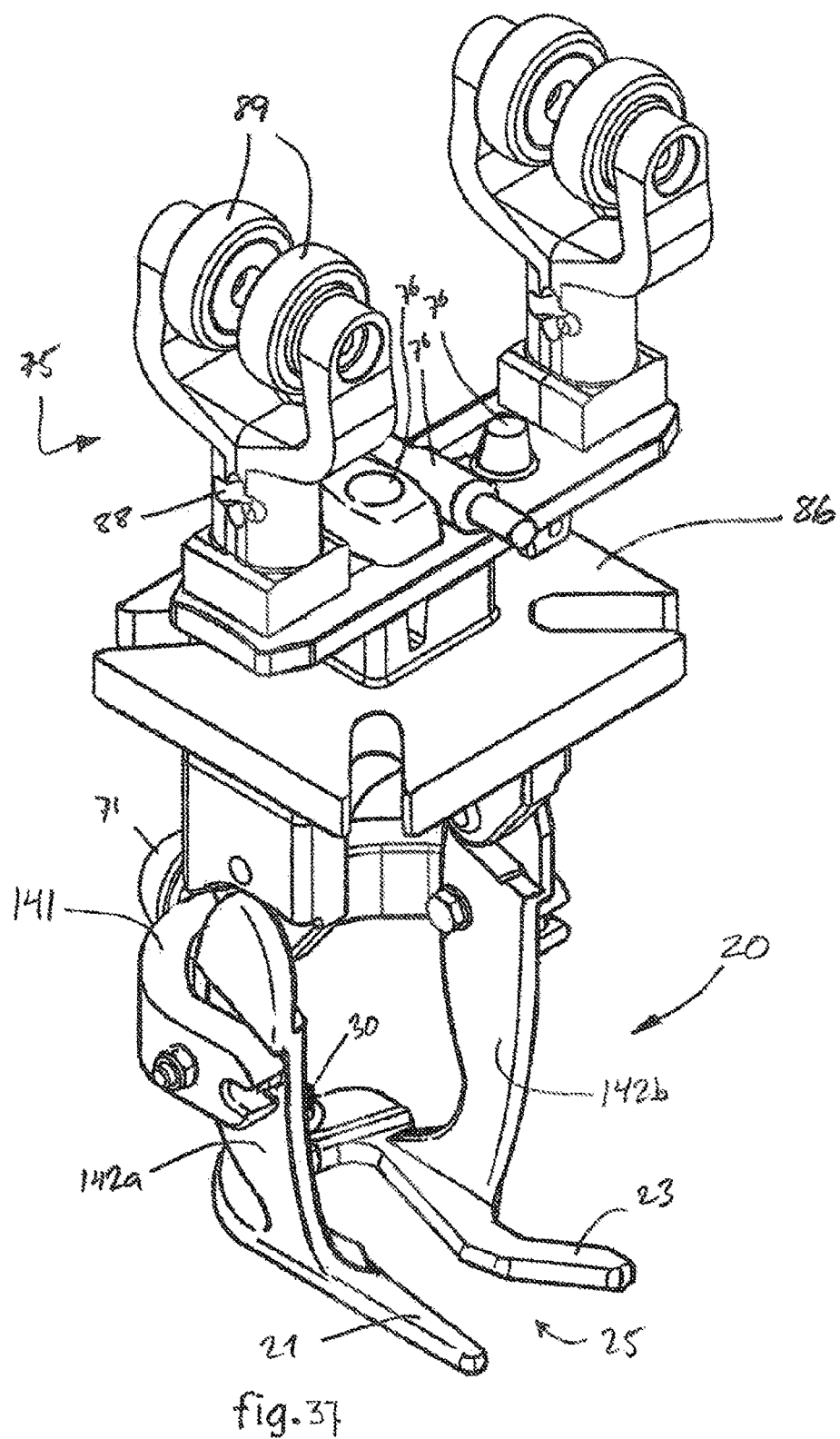

FIG. 37 shows a further embodiment of the invention. Like in the embodiment of FIG. 28, the jaw elements 21, 23 are rather narrow. The legs 142a, 142b are curved. The cross bar 141 is connected to the outside of the legs 142a, 142b. Alternatively, it could be attached to the inside of those legs. The cross bar 141 can be made of a plastic, preferably an engineering plastic. The cross bar 141 can be made of a polymeric plastic.

In the embodiment of FIG. 37, optionally the carrier 20 is pivotable relative to the indexing plate 86 of the trolley 75. Optional cam follower 71 is adapted to control this relative pivoting. The trolley 75 optionally comprises trolley elements 76, e.g for guiding the trolley 75 and for attaching the carrier 20 to the trolley 75.

Figures 38, 39:
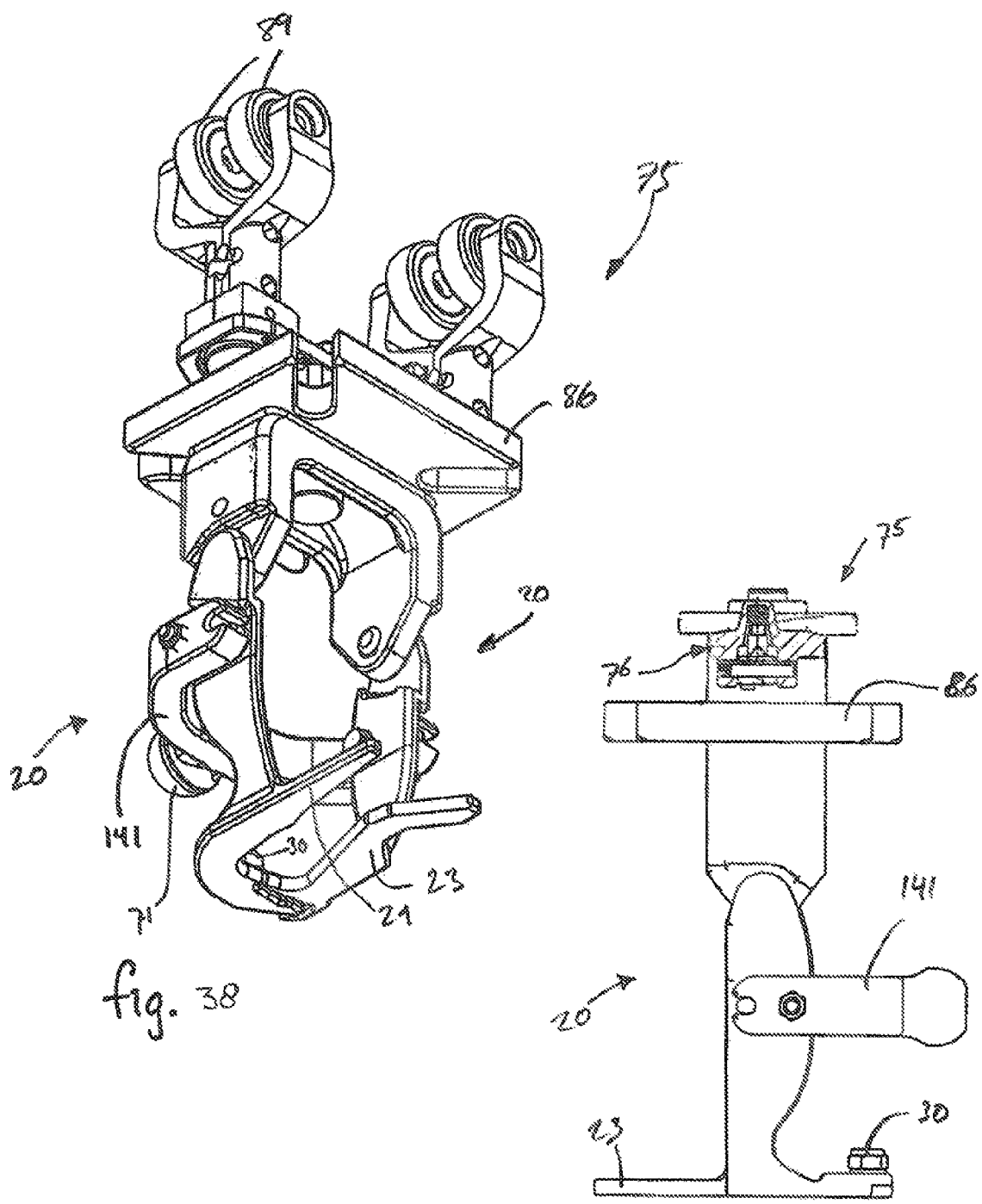

FIG. 38 shows an embodiment that is similar to the embodiment of FIG. 37.

FIG. 39 shows a side view of a further embodiment. Trolley 75 is only shown in part.

FIG. 40 shows a further embodiment.

Figure 1:
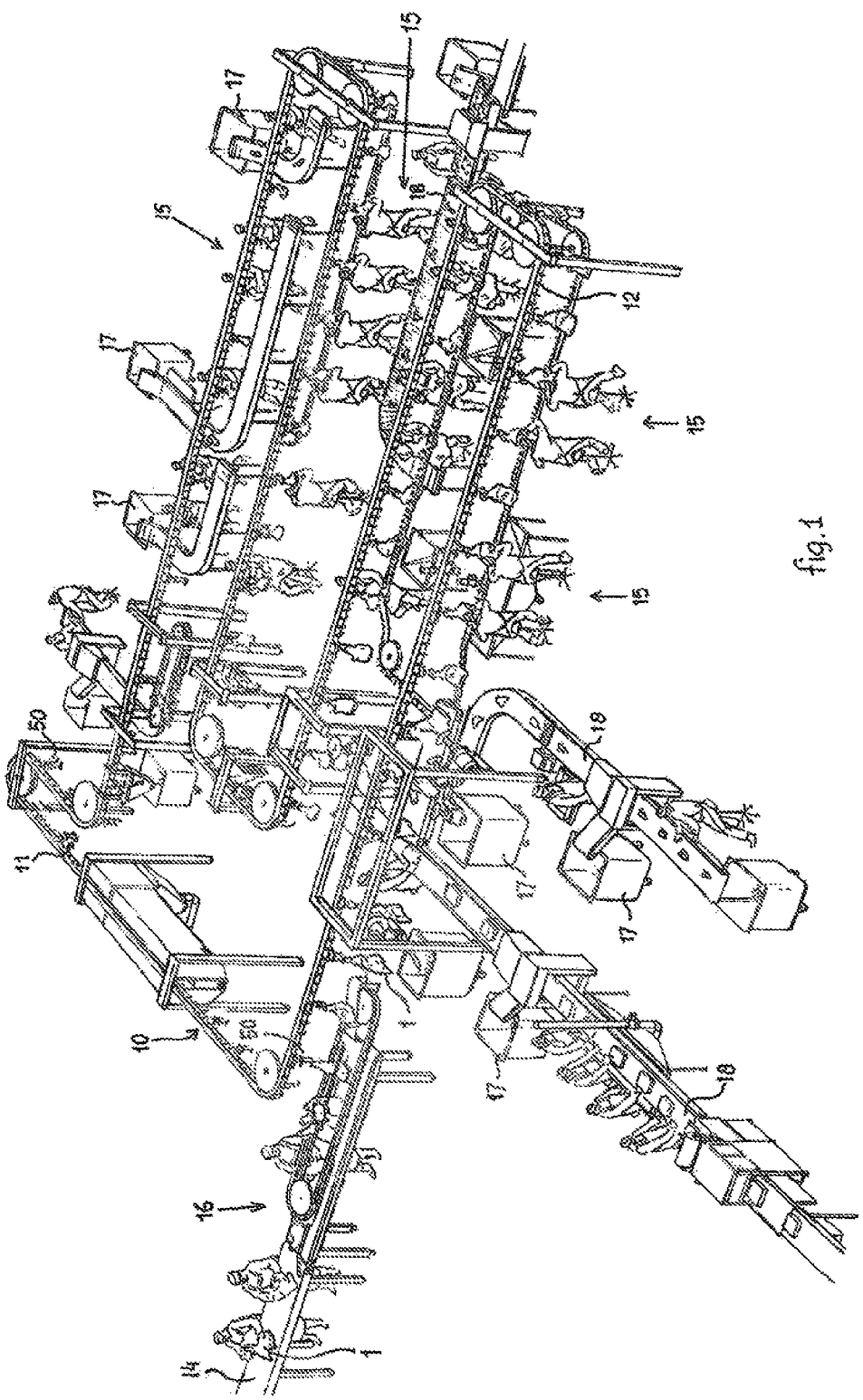
Figure 2:
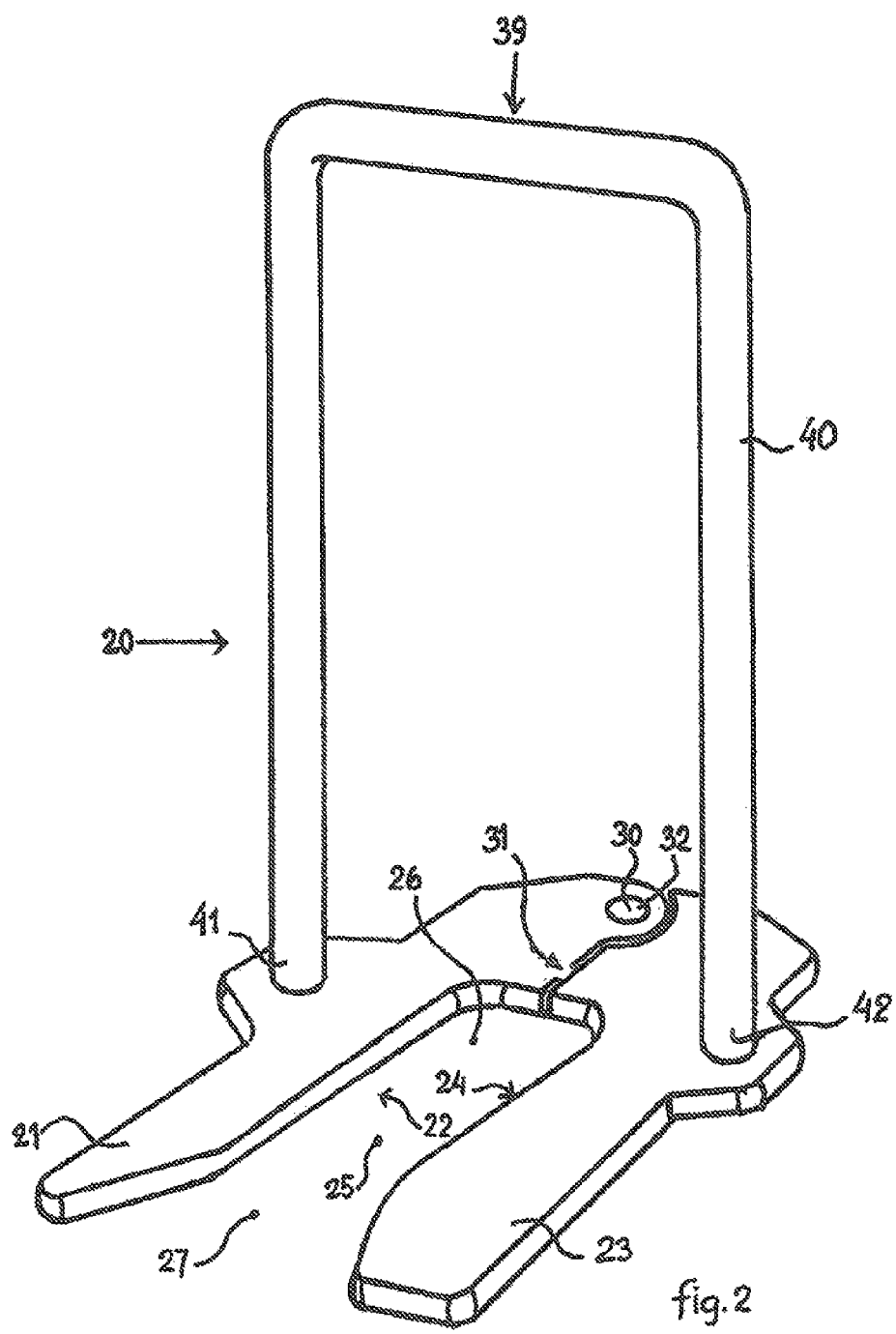
Figure 3:
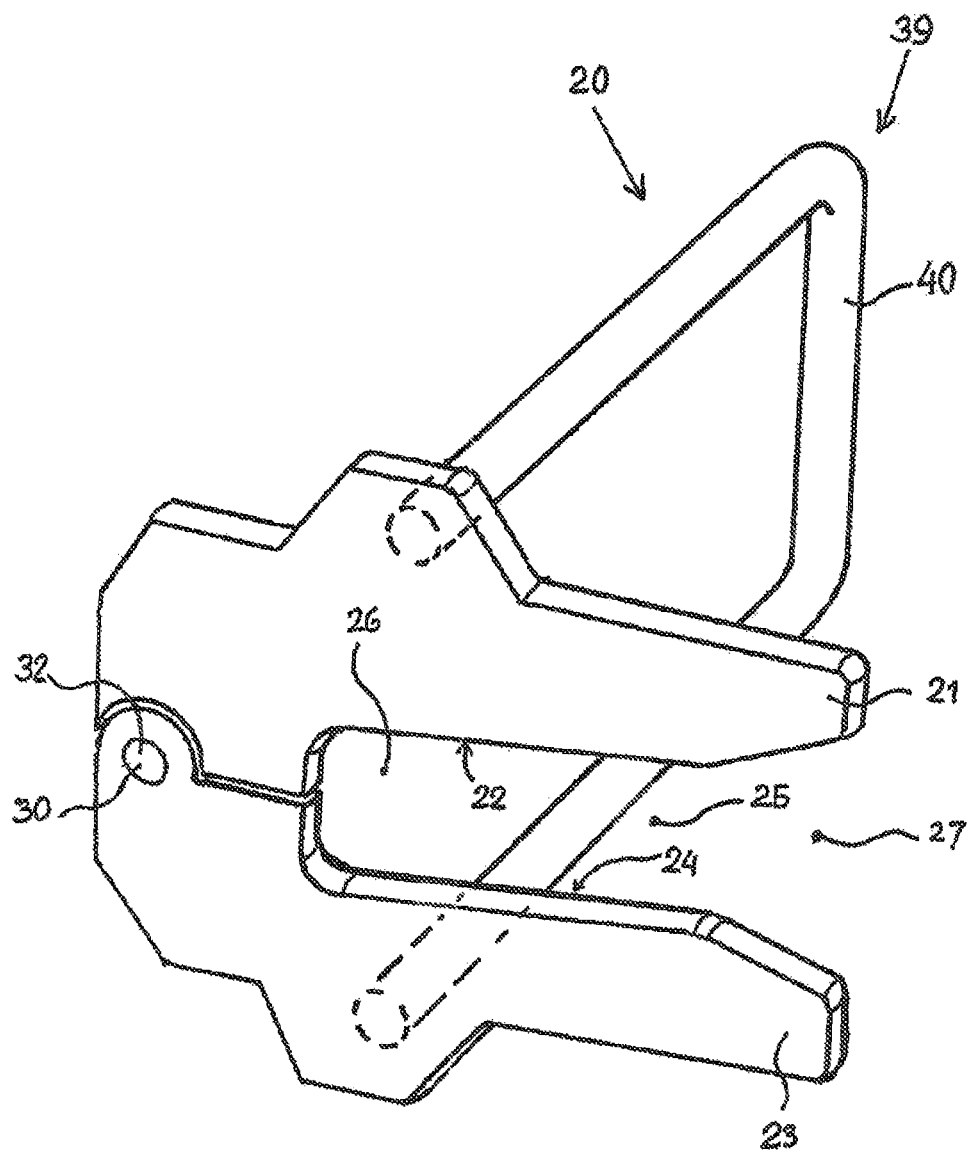
Figure 4A:
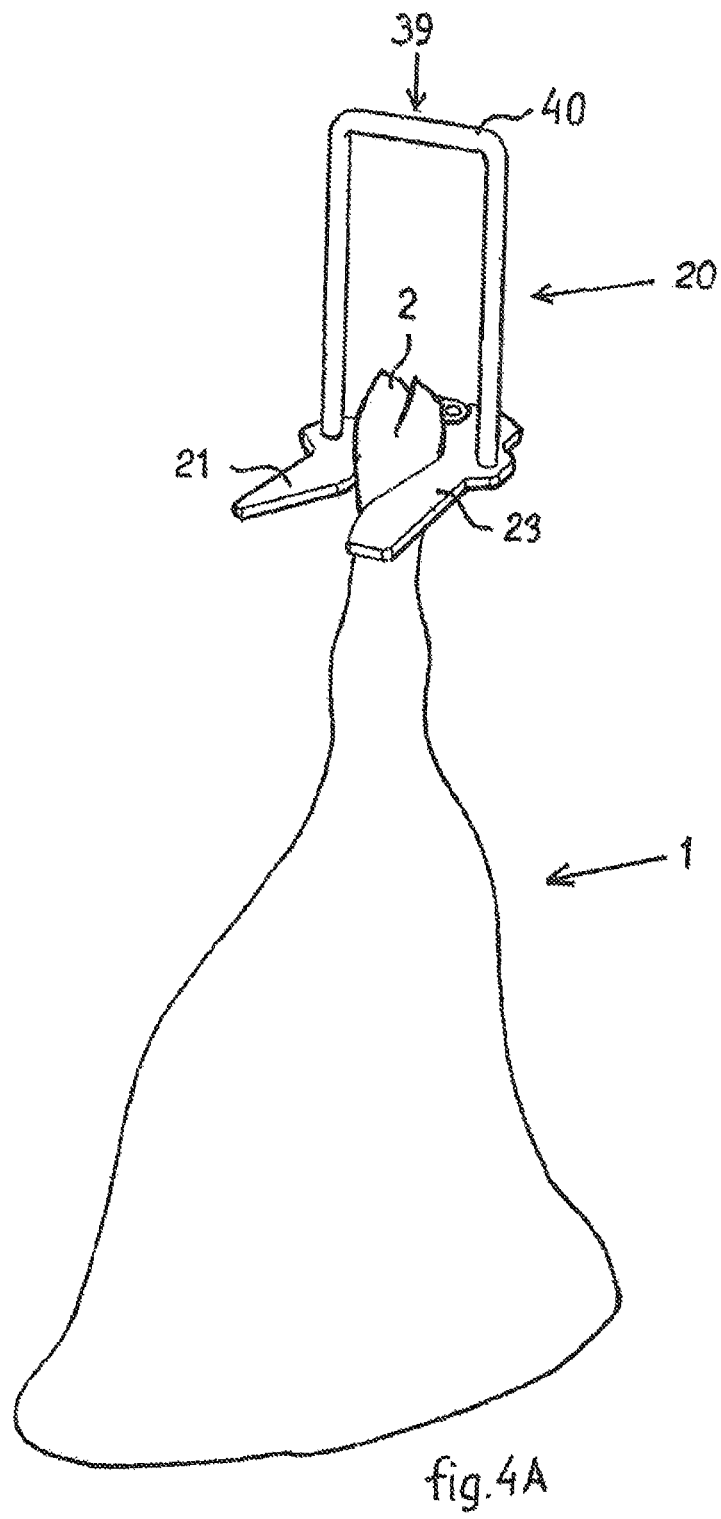
Figure 4B:
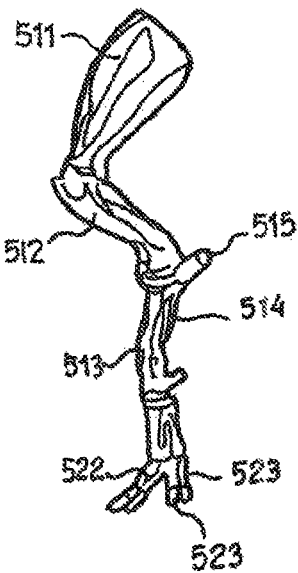
Figure 4C:
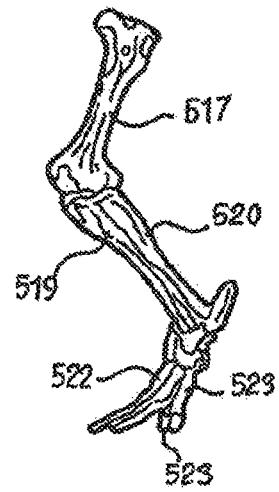
Figure 4D:
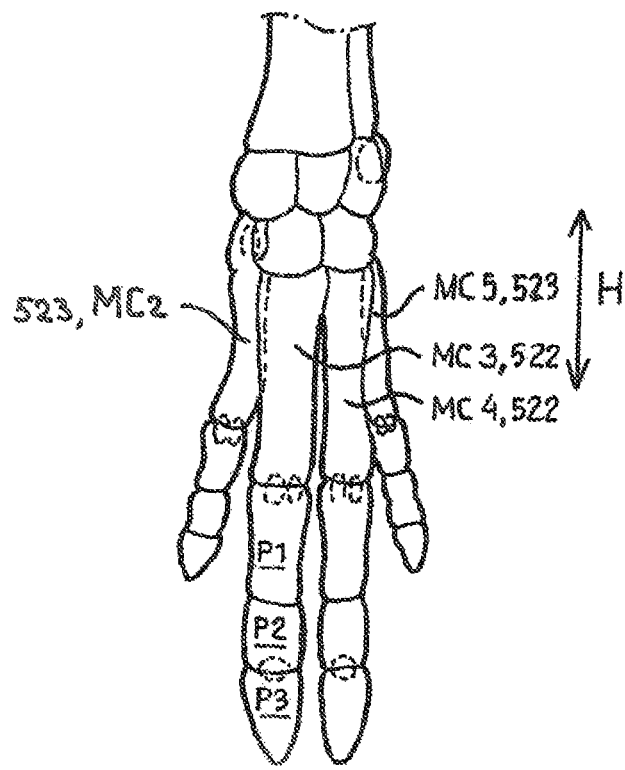
Figure 4E:
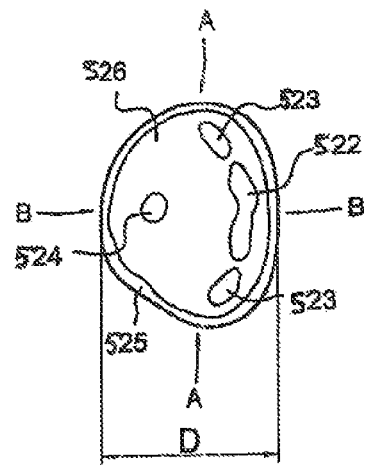
Figure 4F:
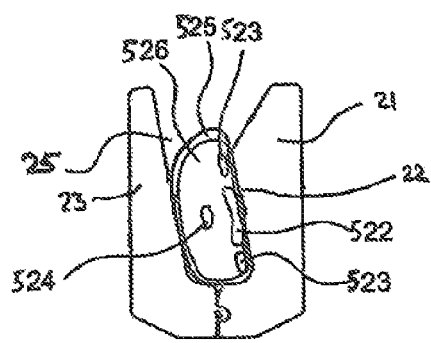
Figure 4E:
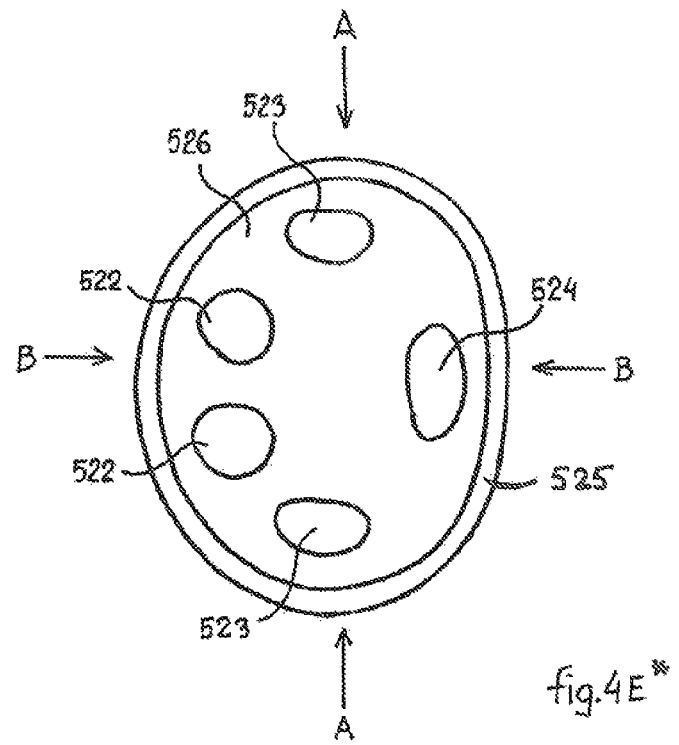
Figure 4F:
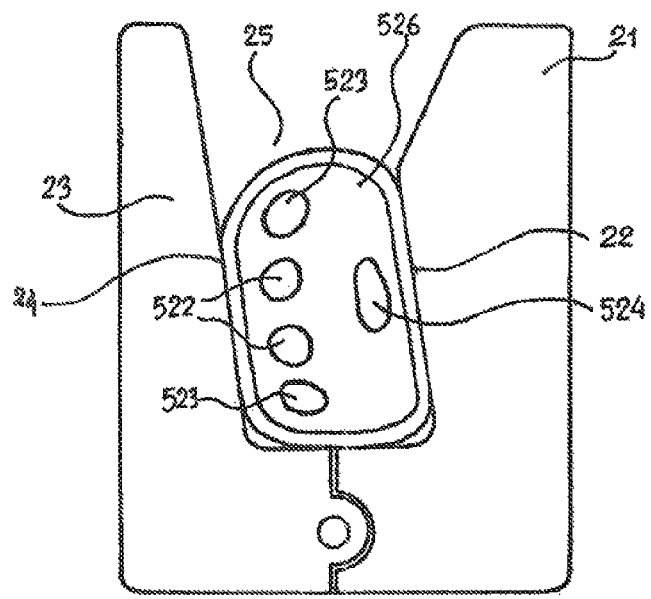
Figure 4G:
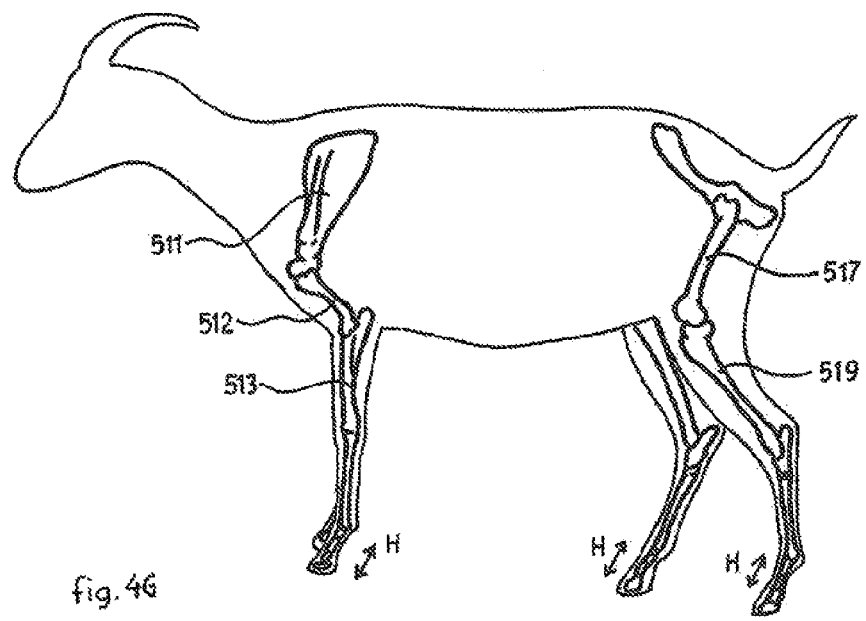
Figure 4H:
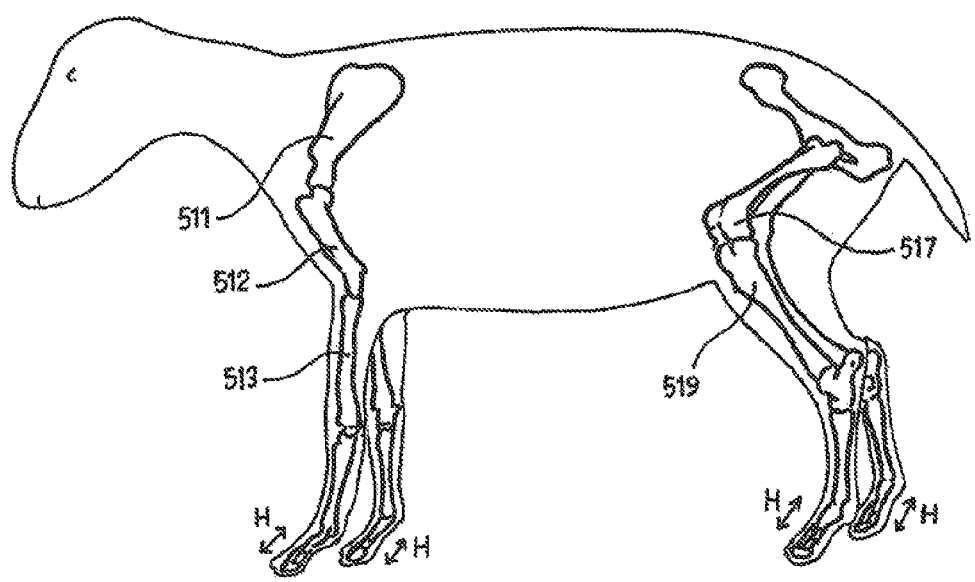
Figure 41:
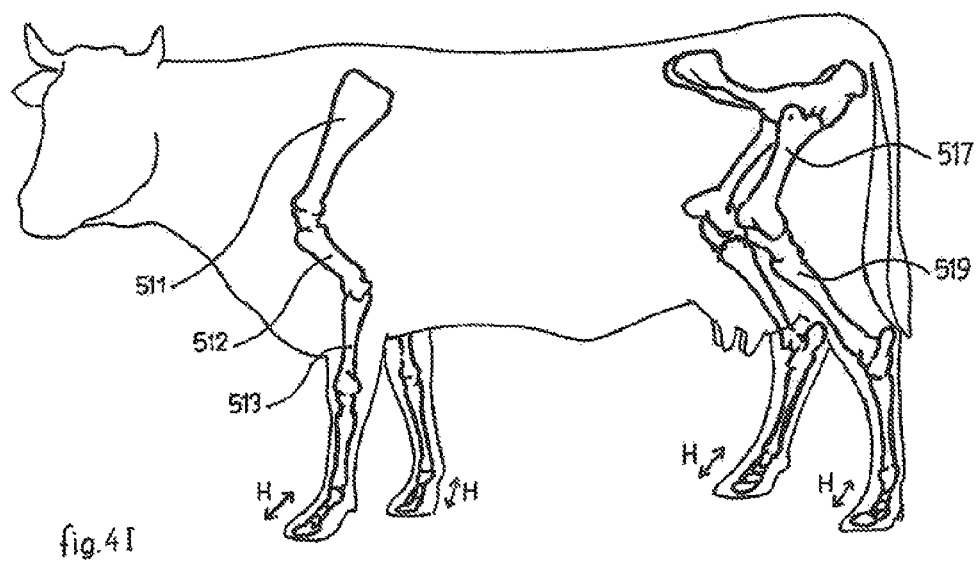
Figure 5:
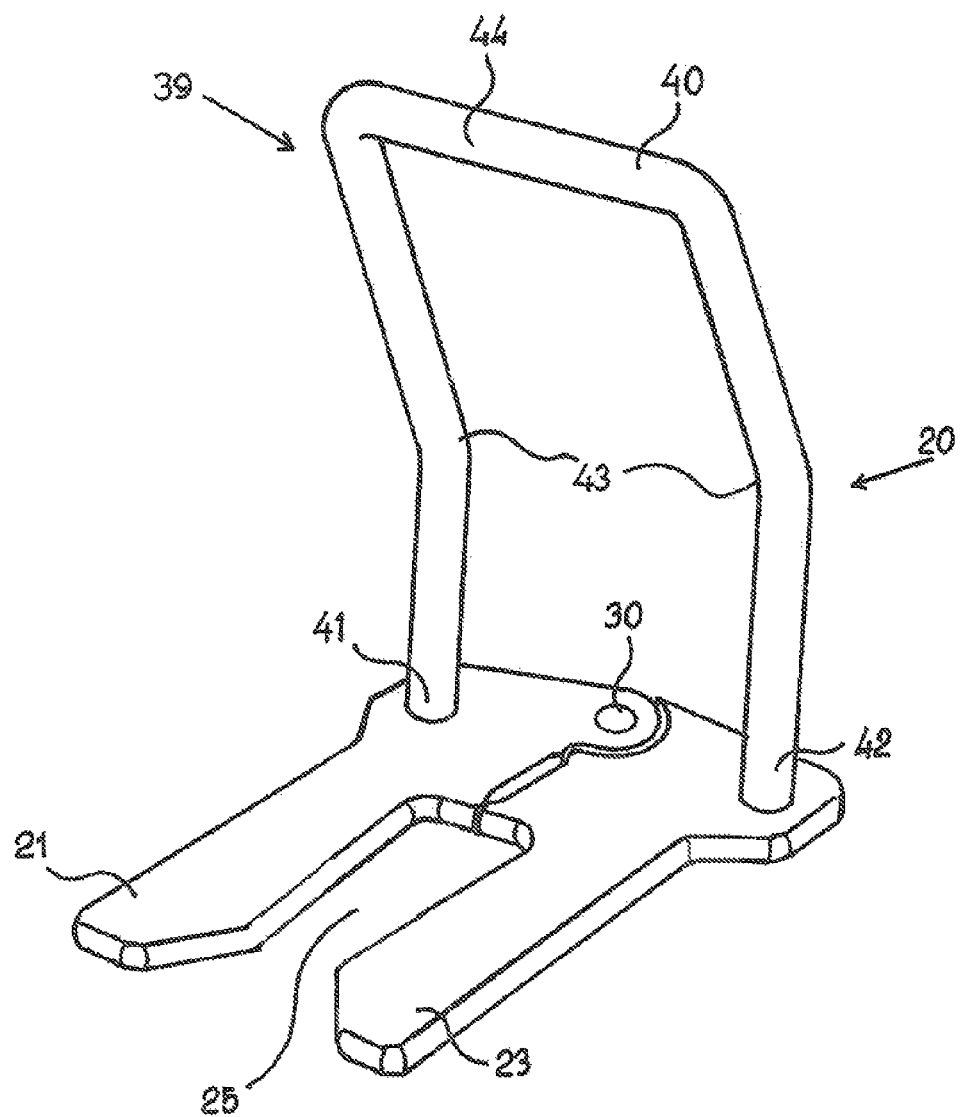
Figure 5A:
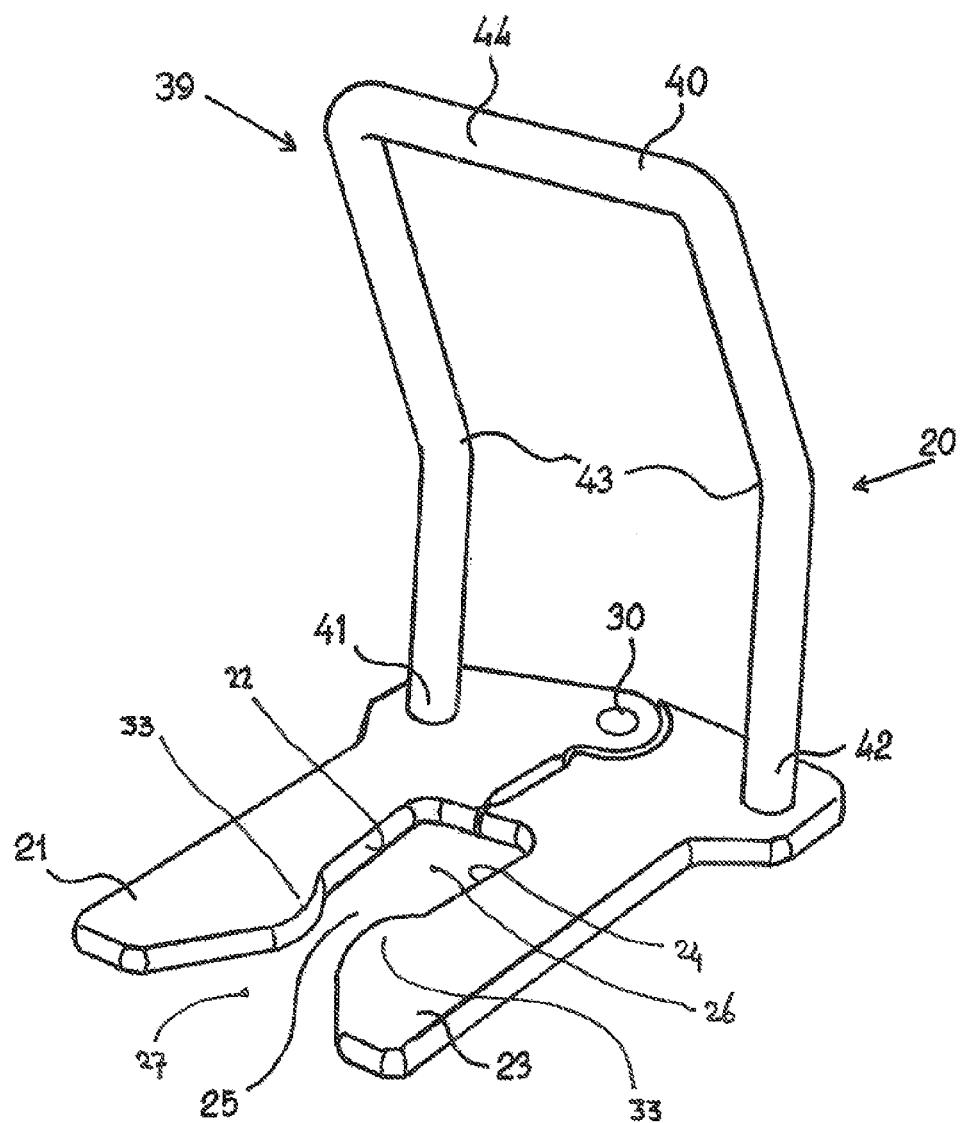
Figure 7:
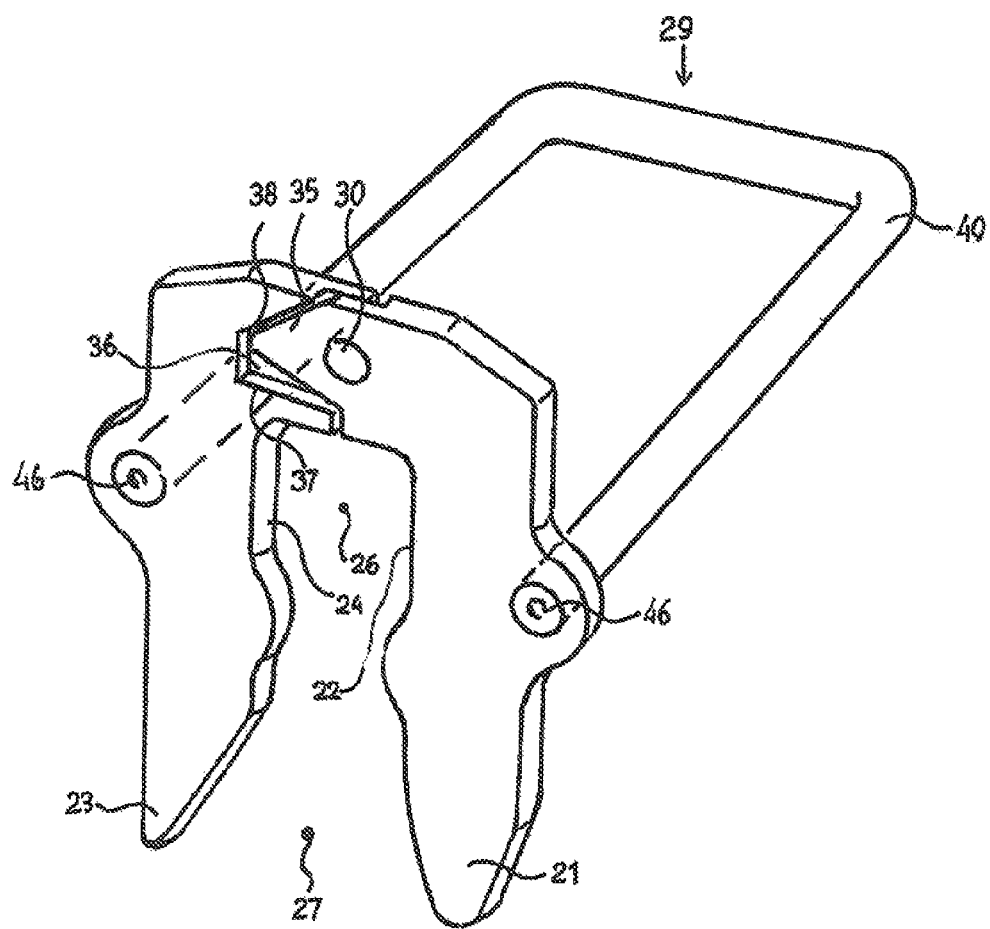
Figure 8:
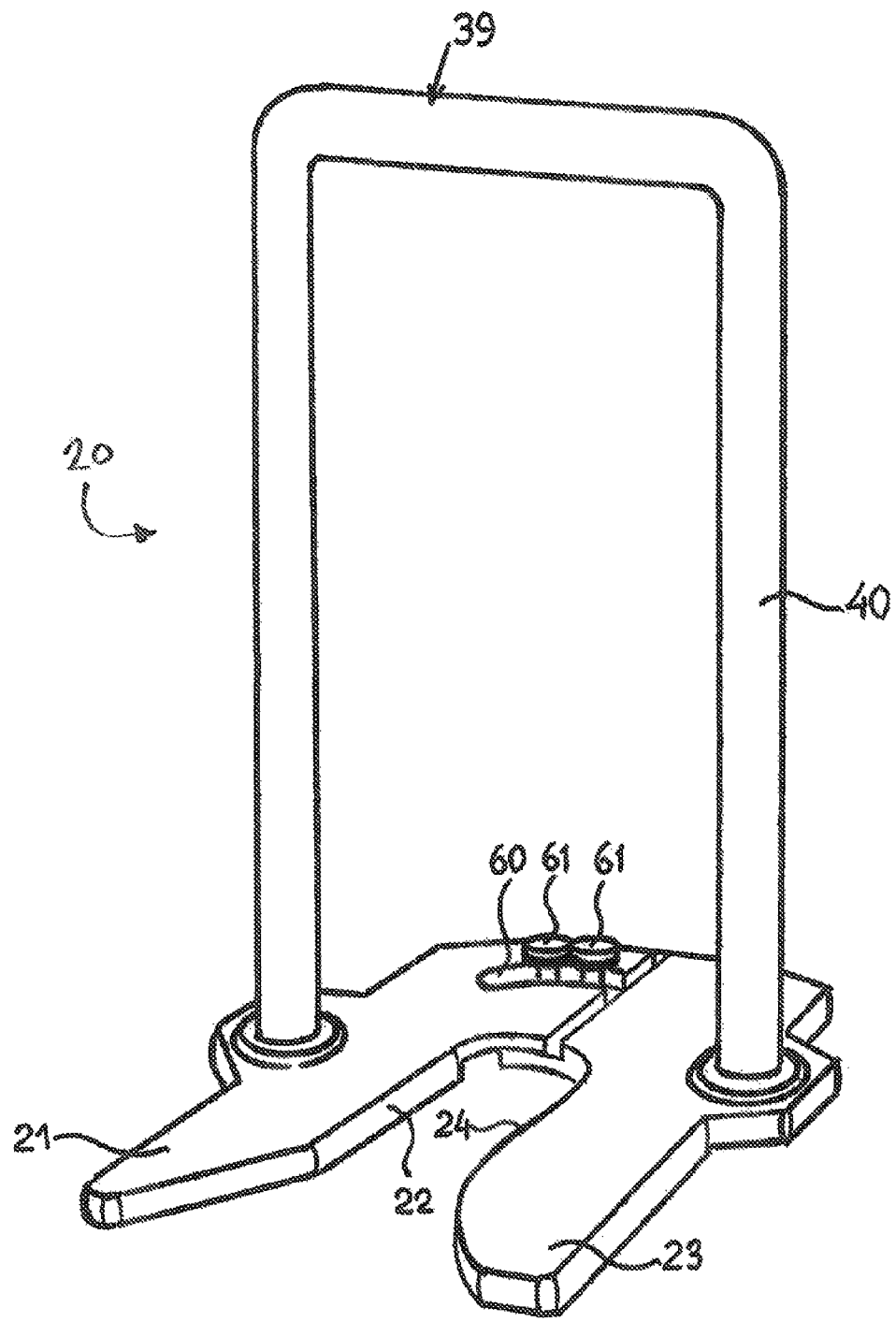
Figure 9:
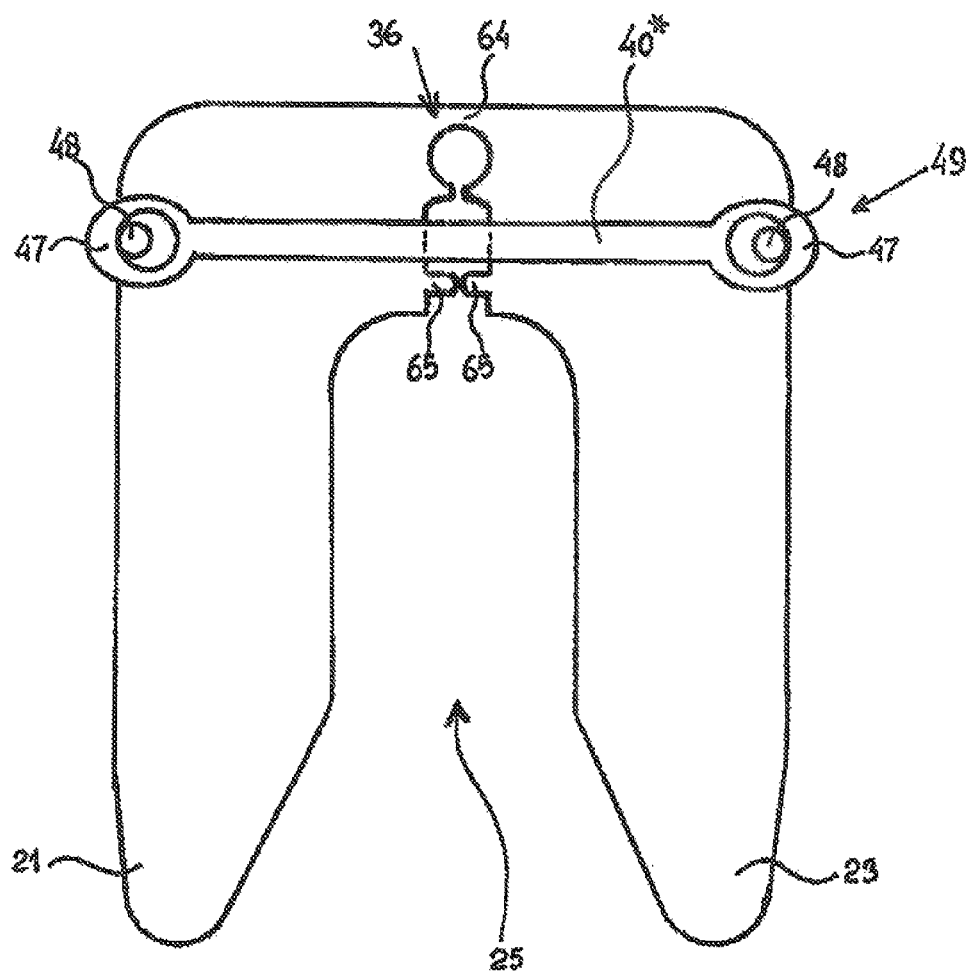
Figure 10:
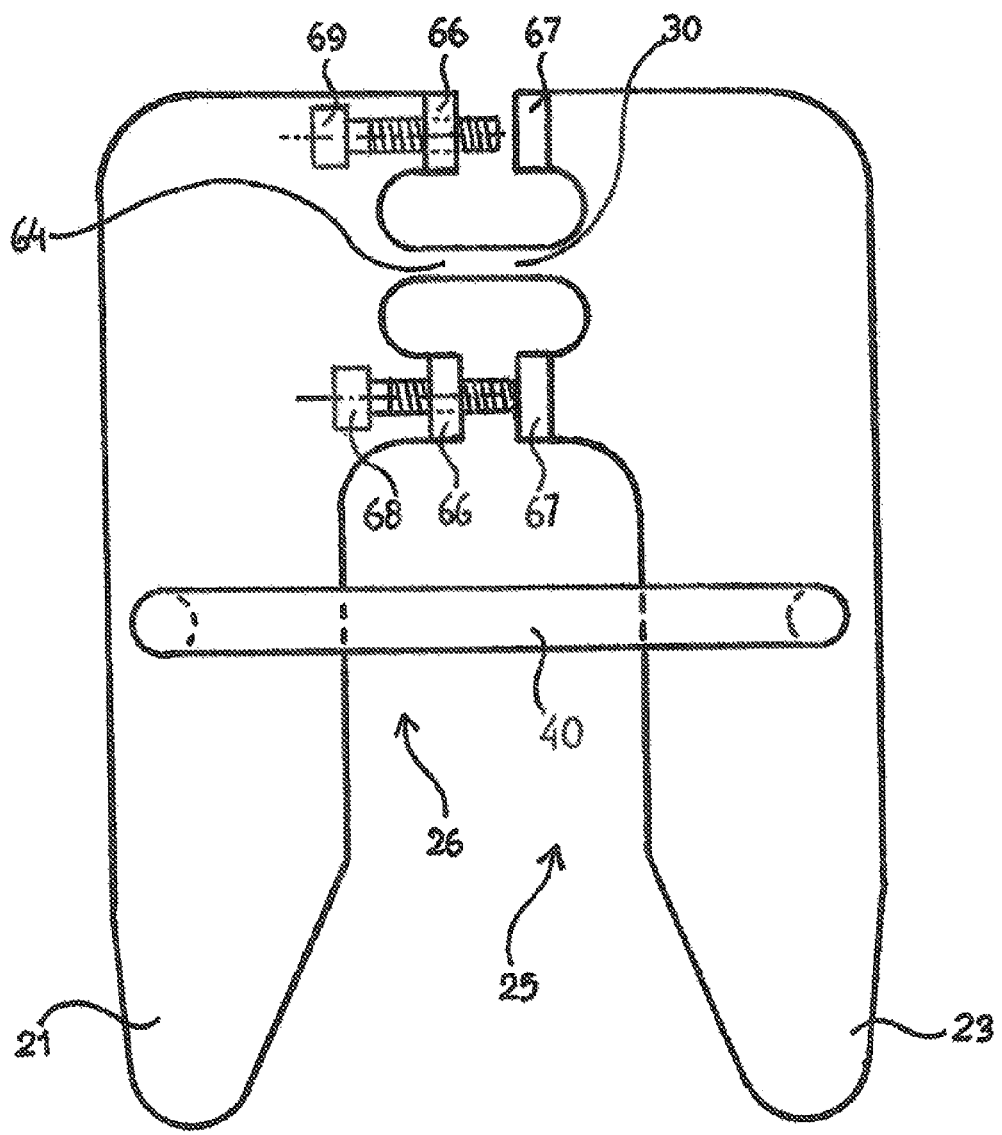
Figure 11:
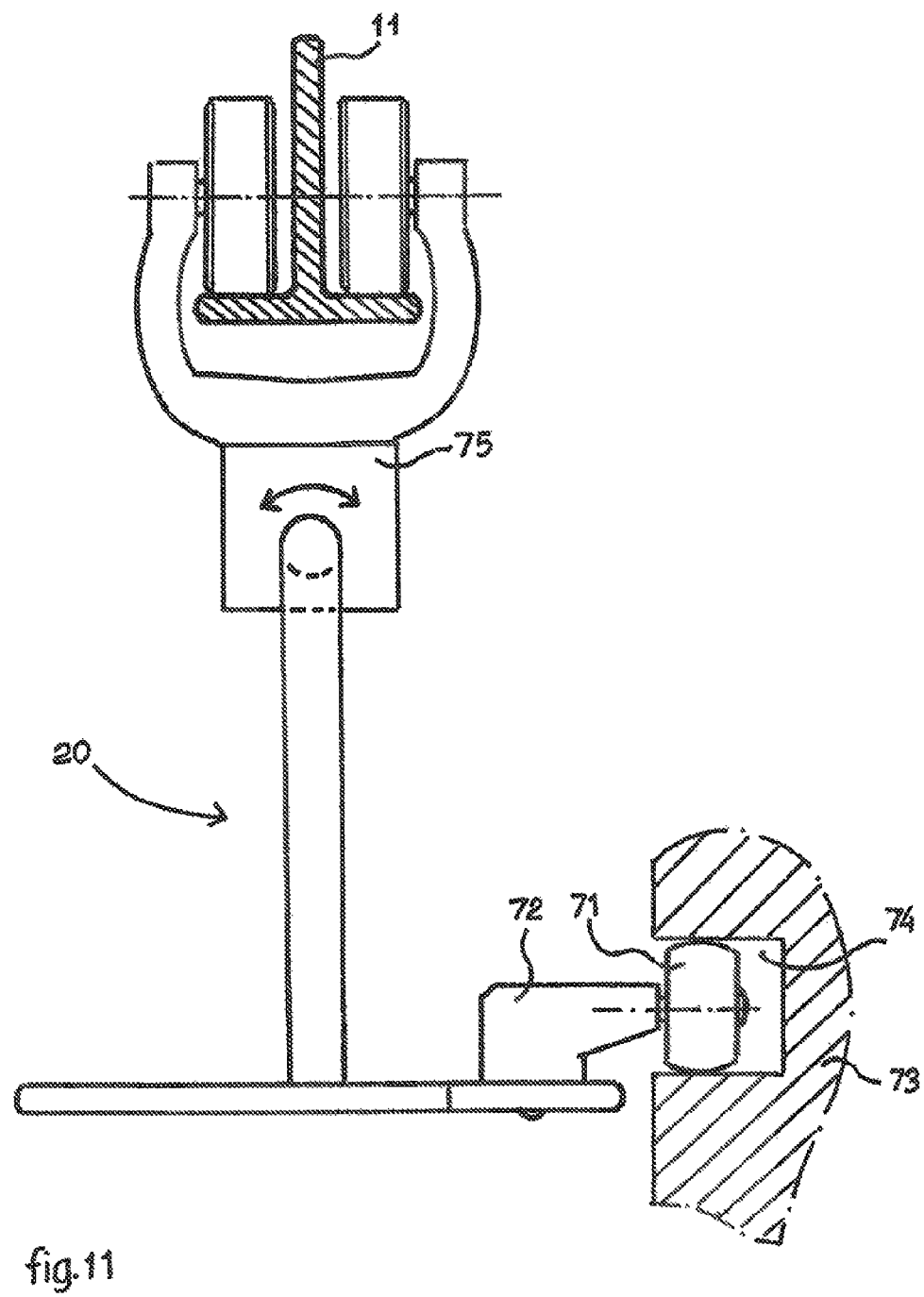
Figure 12:
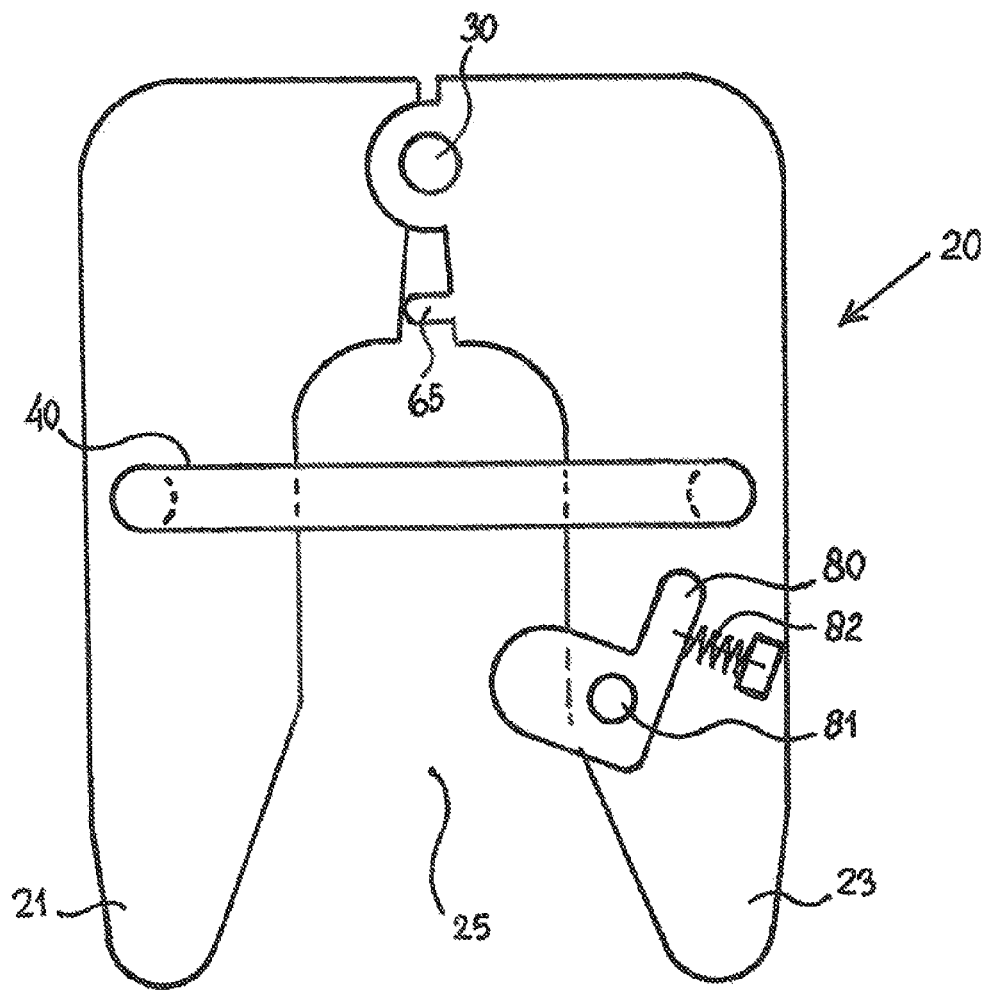
Figure 13:
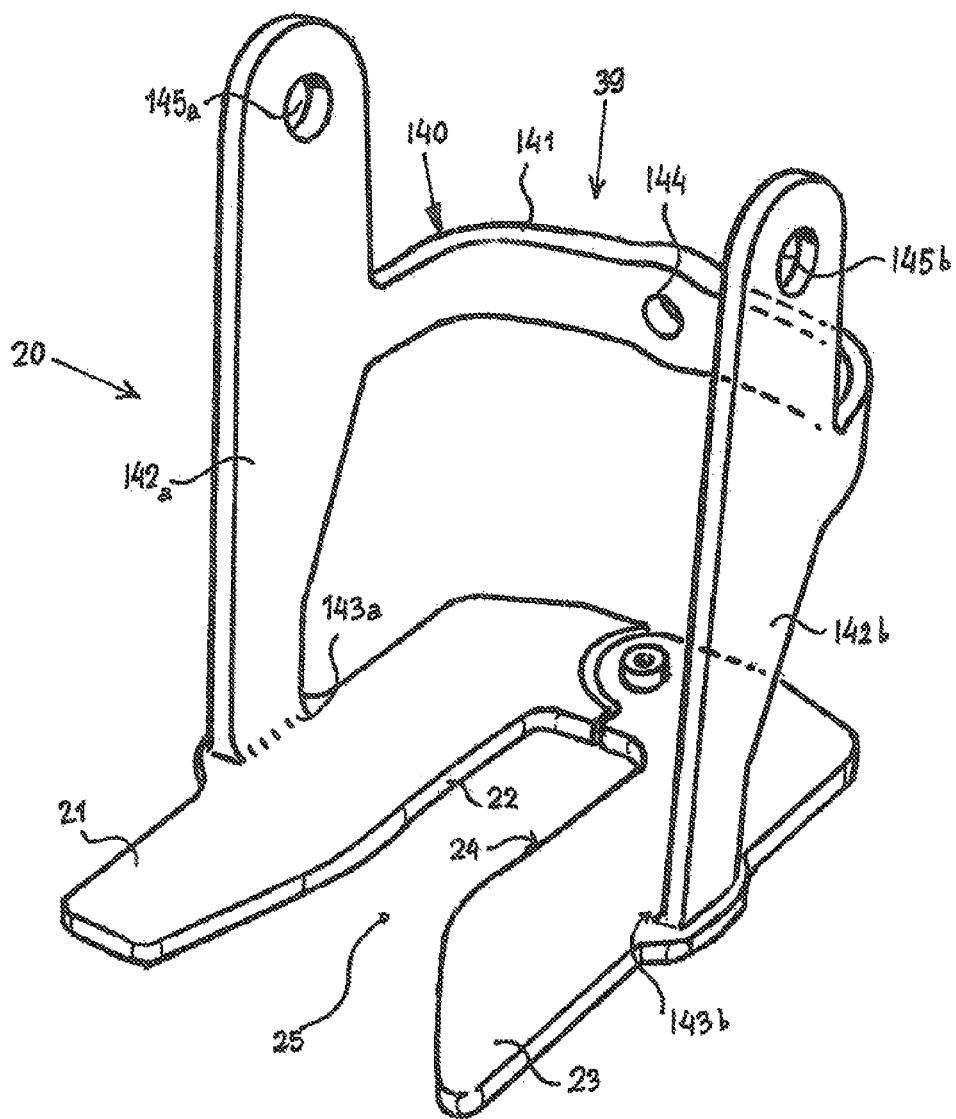
Figure 13A:
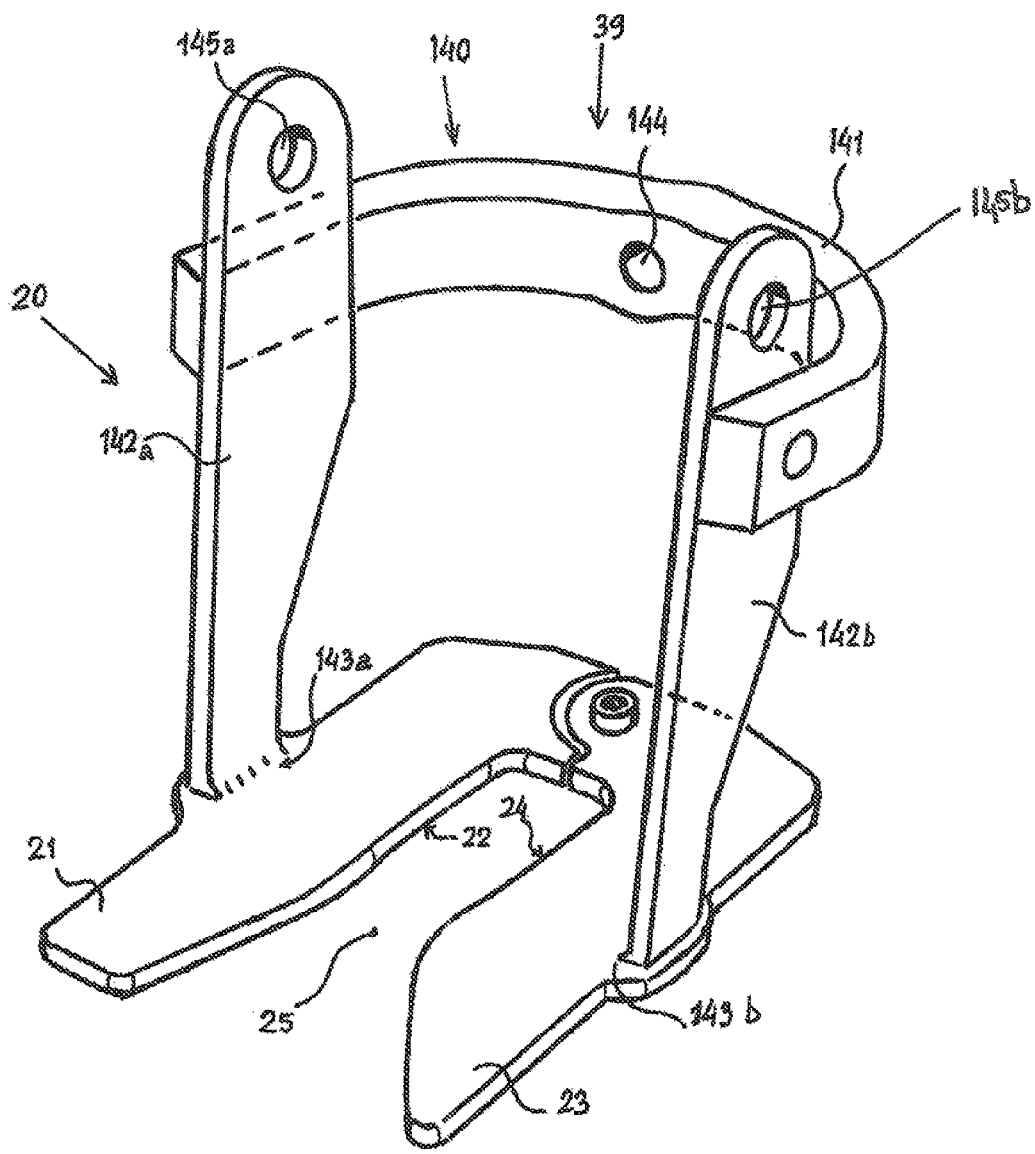
Figure 13B:
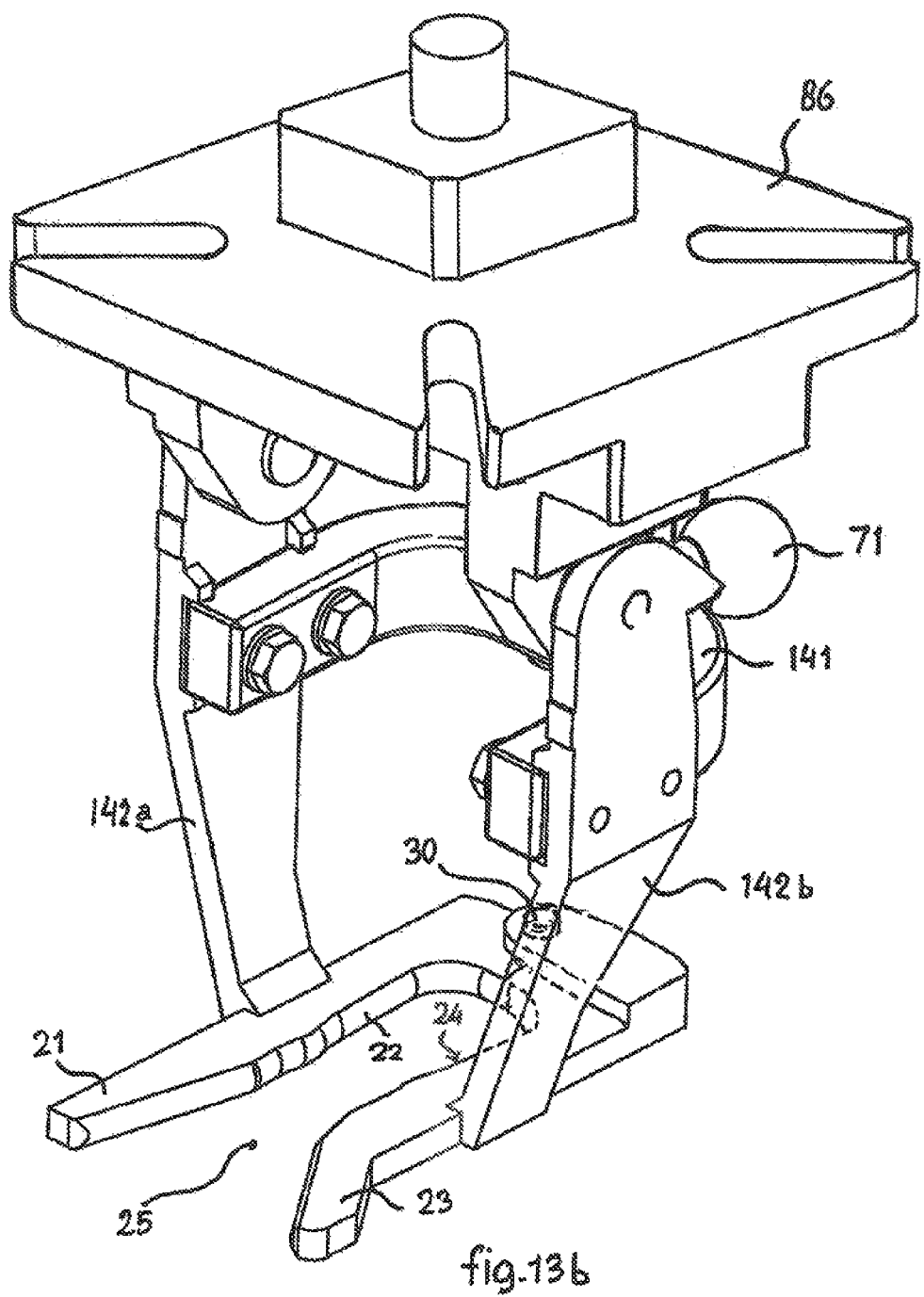
Figure 13C:
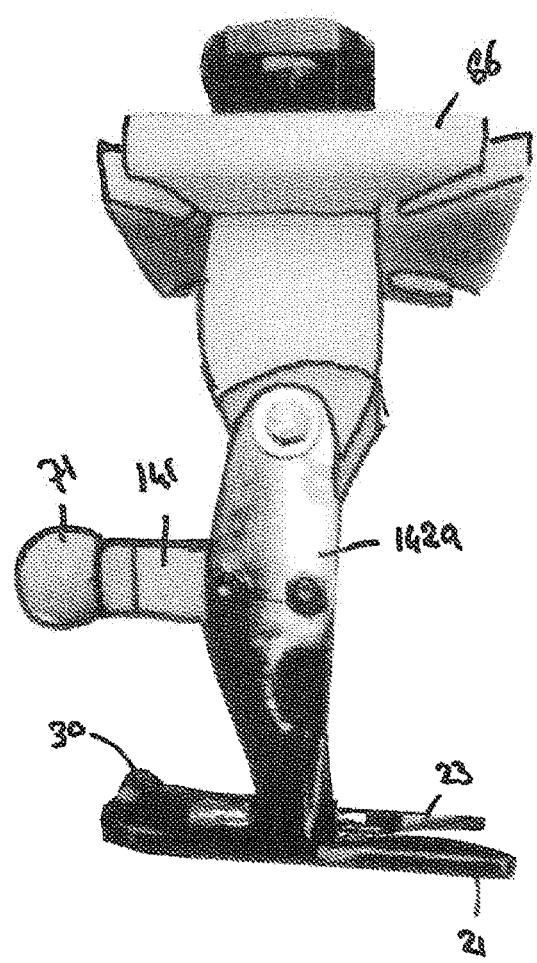
Figure 14A:
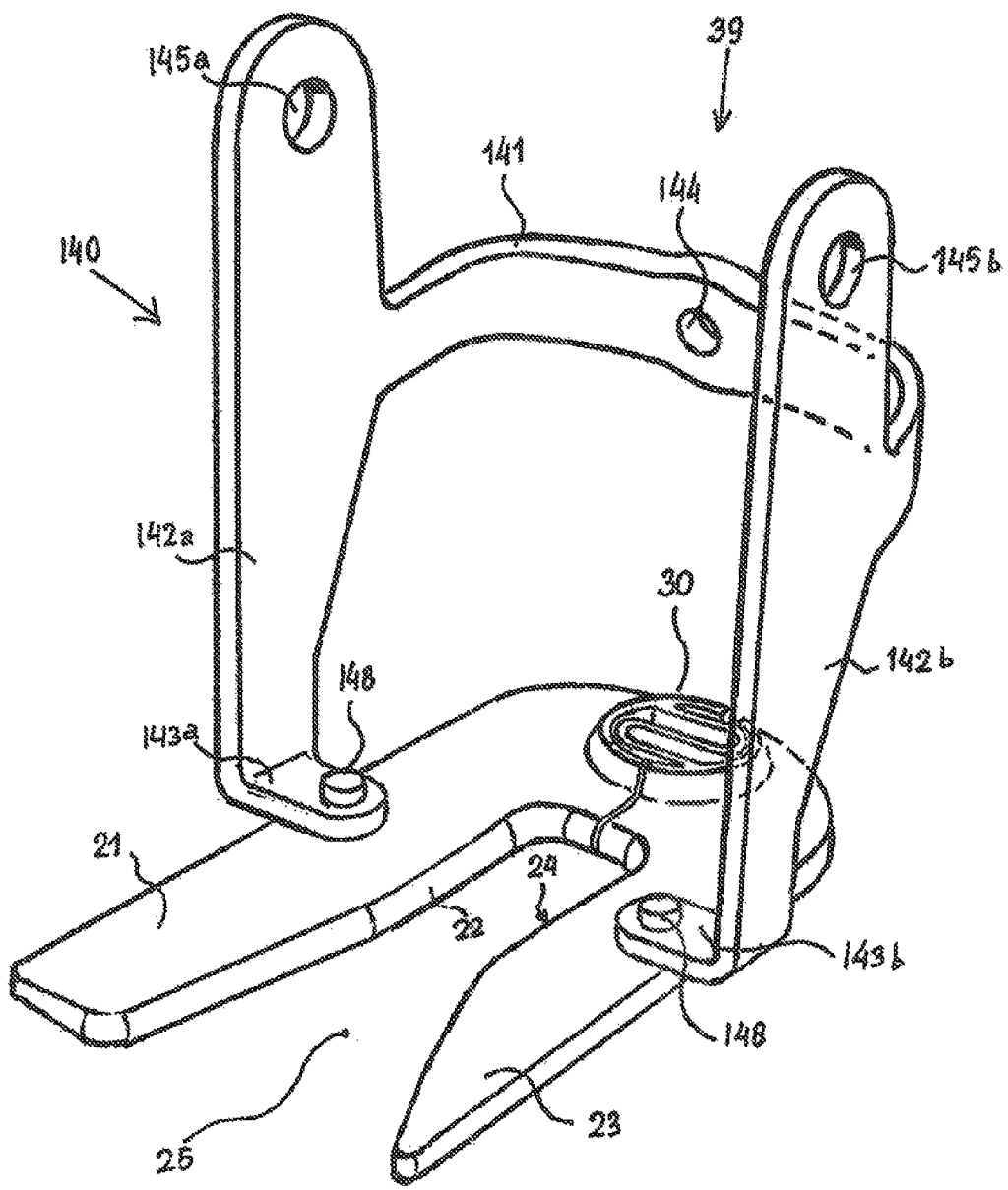
Figure 14B:
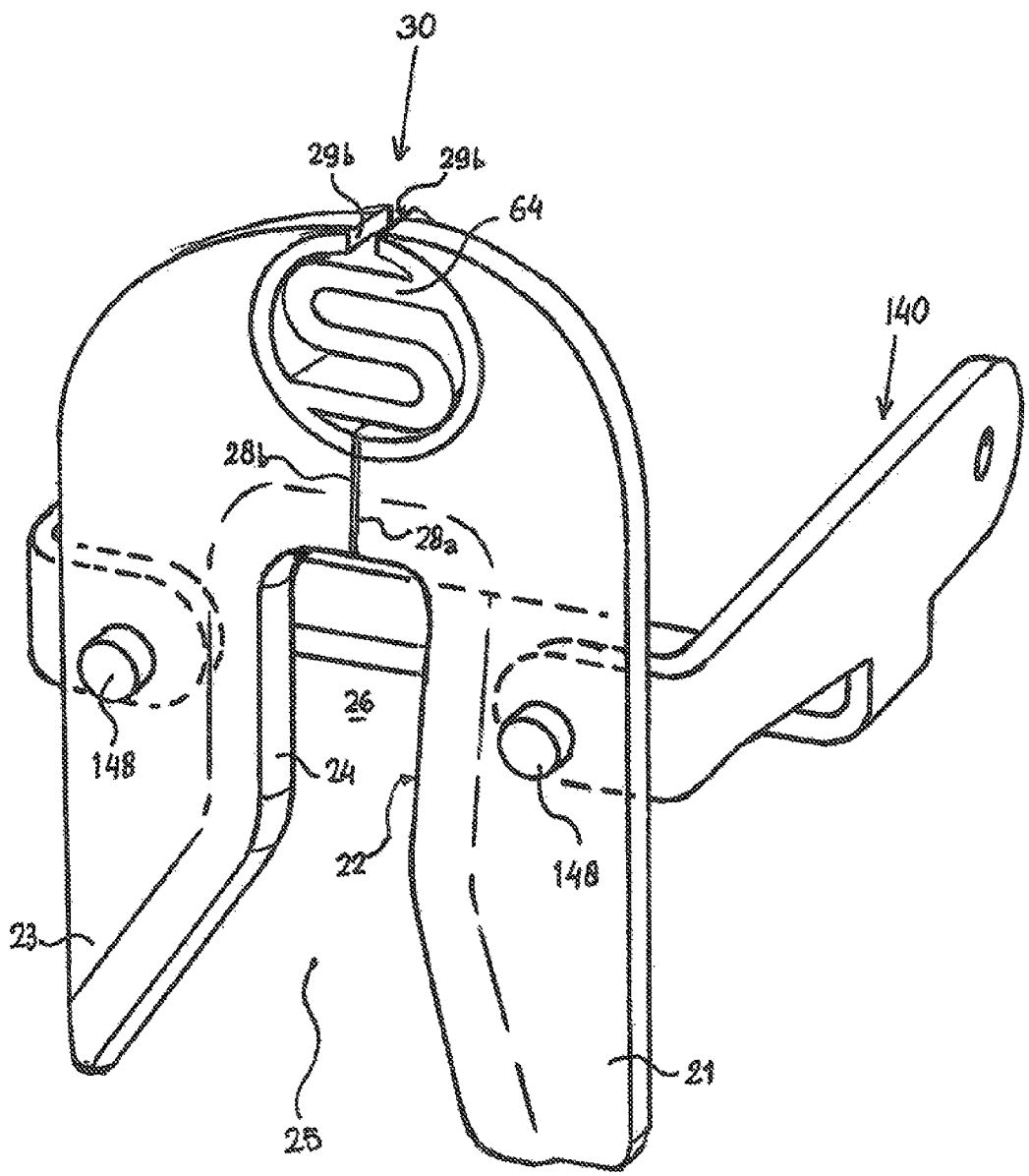
Figure 14C:
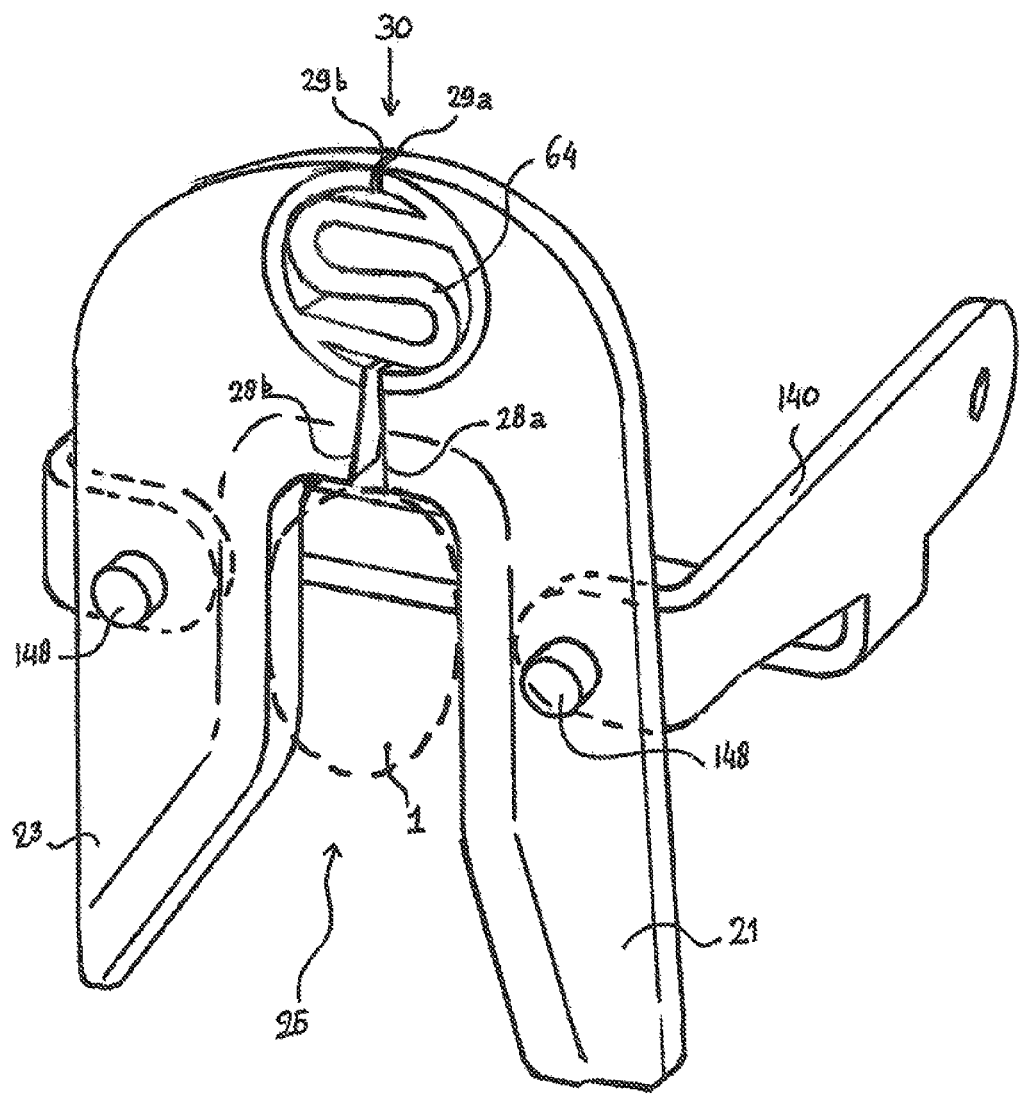
Figure 15:
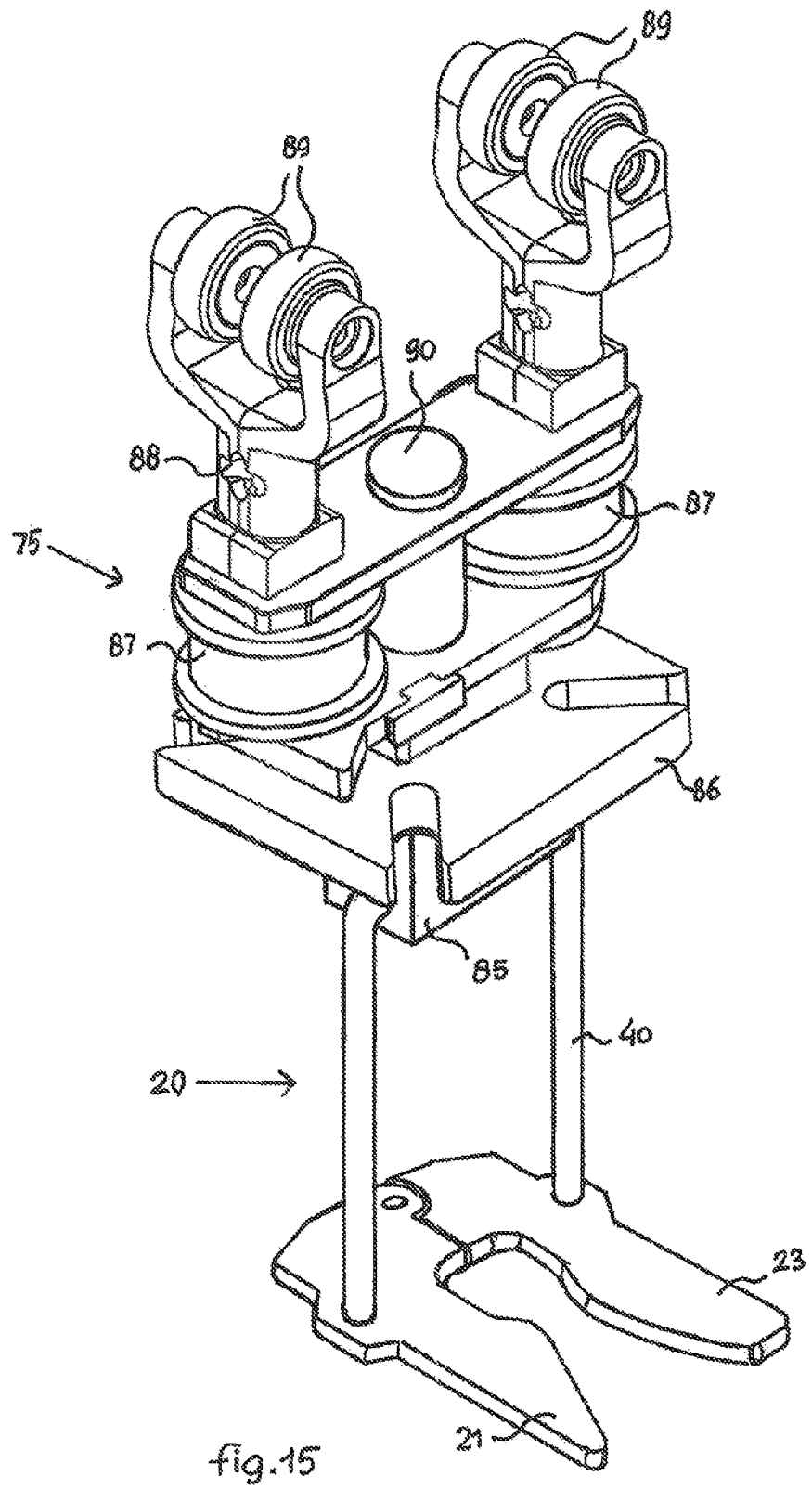
Figure 15A:
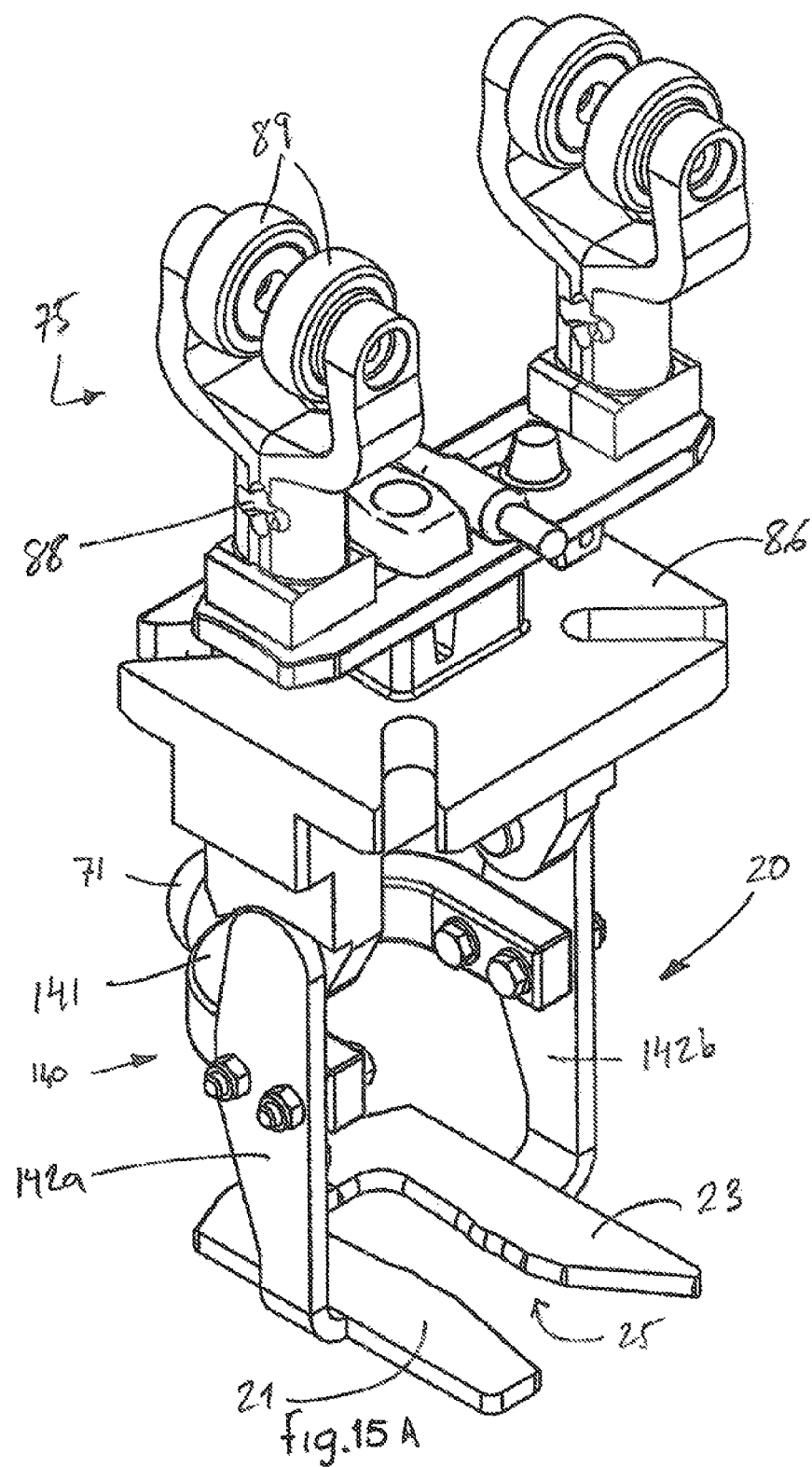
Figure 16:
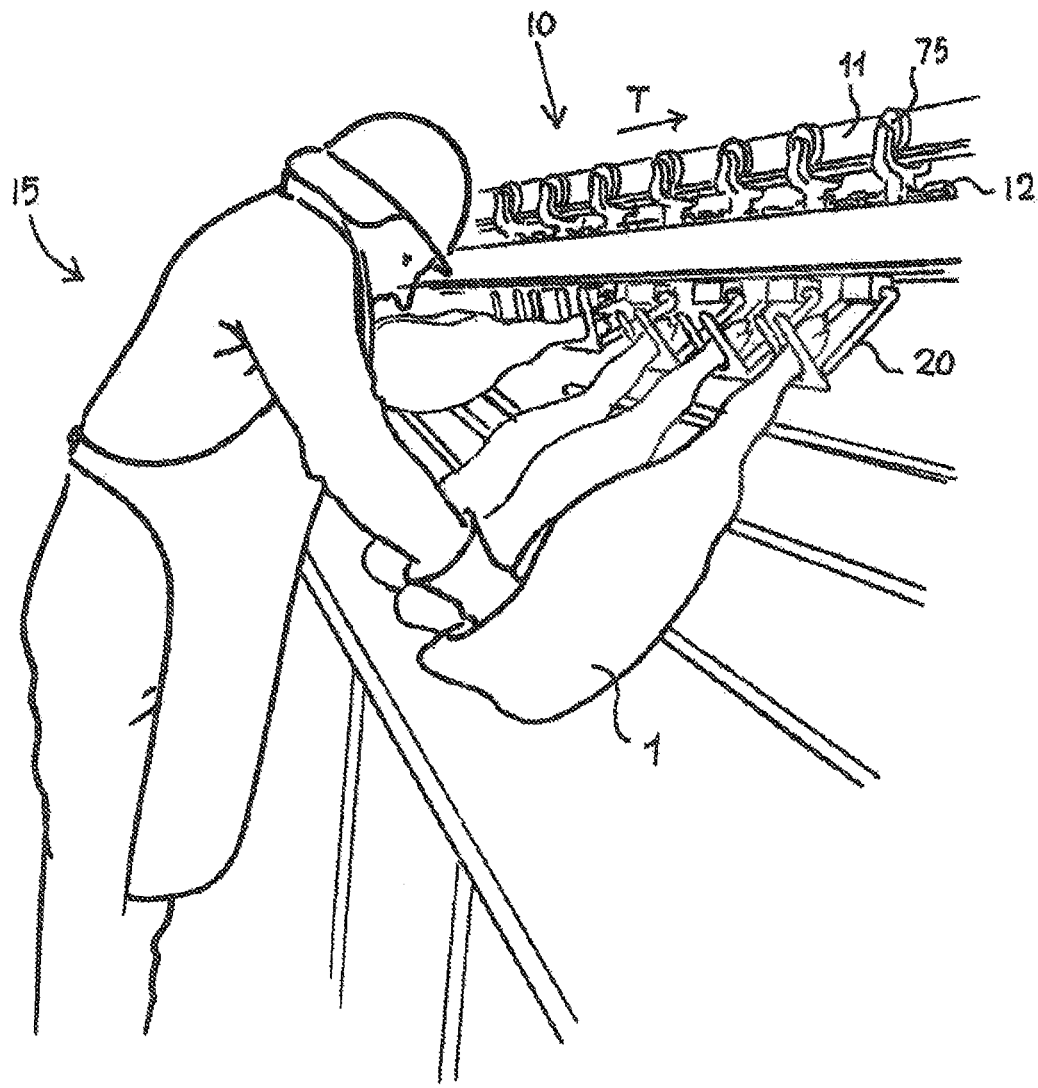
Figure 17:
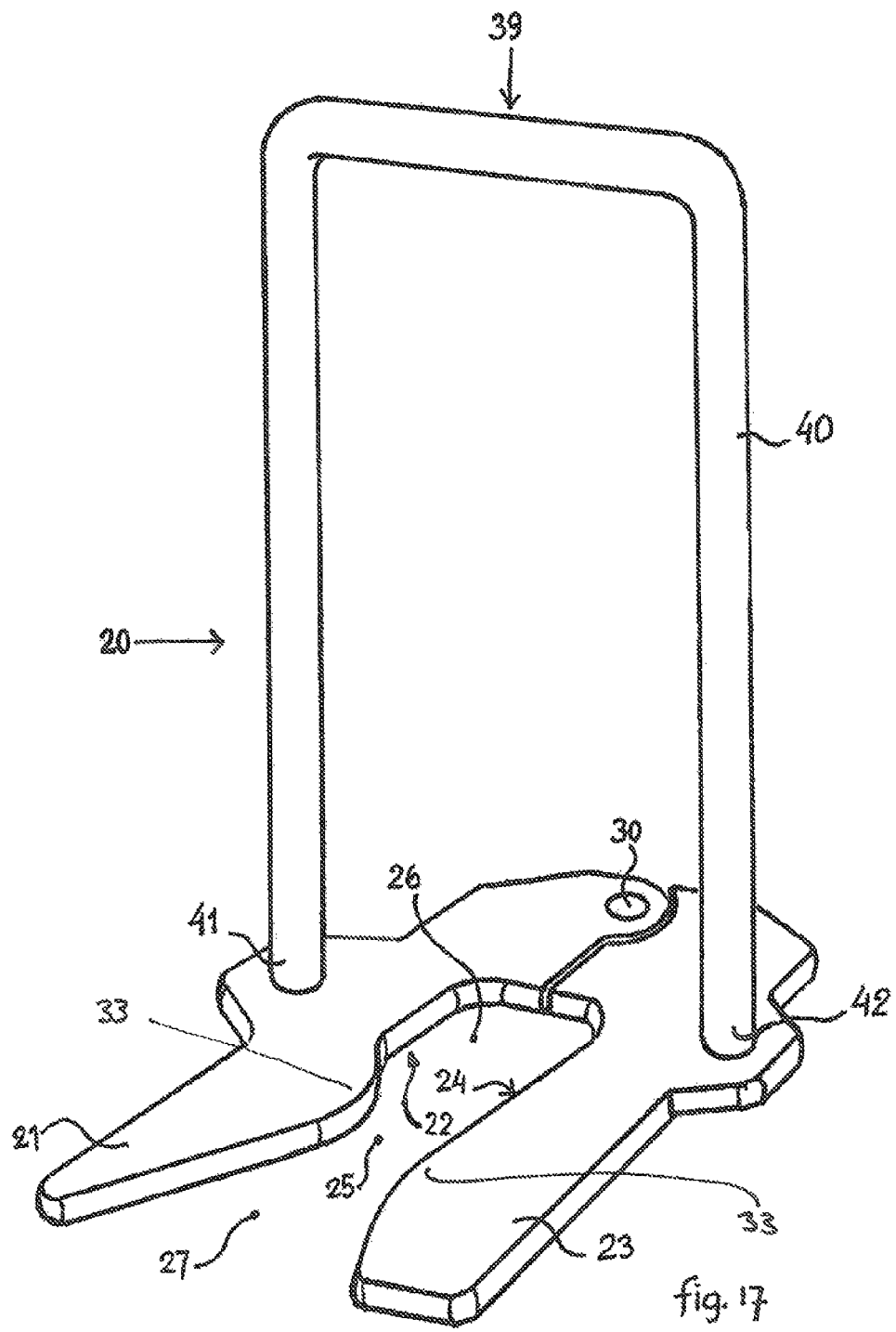
Figure 18:
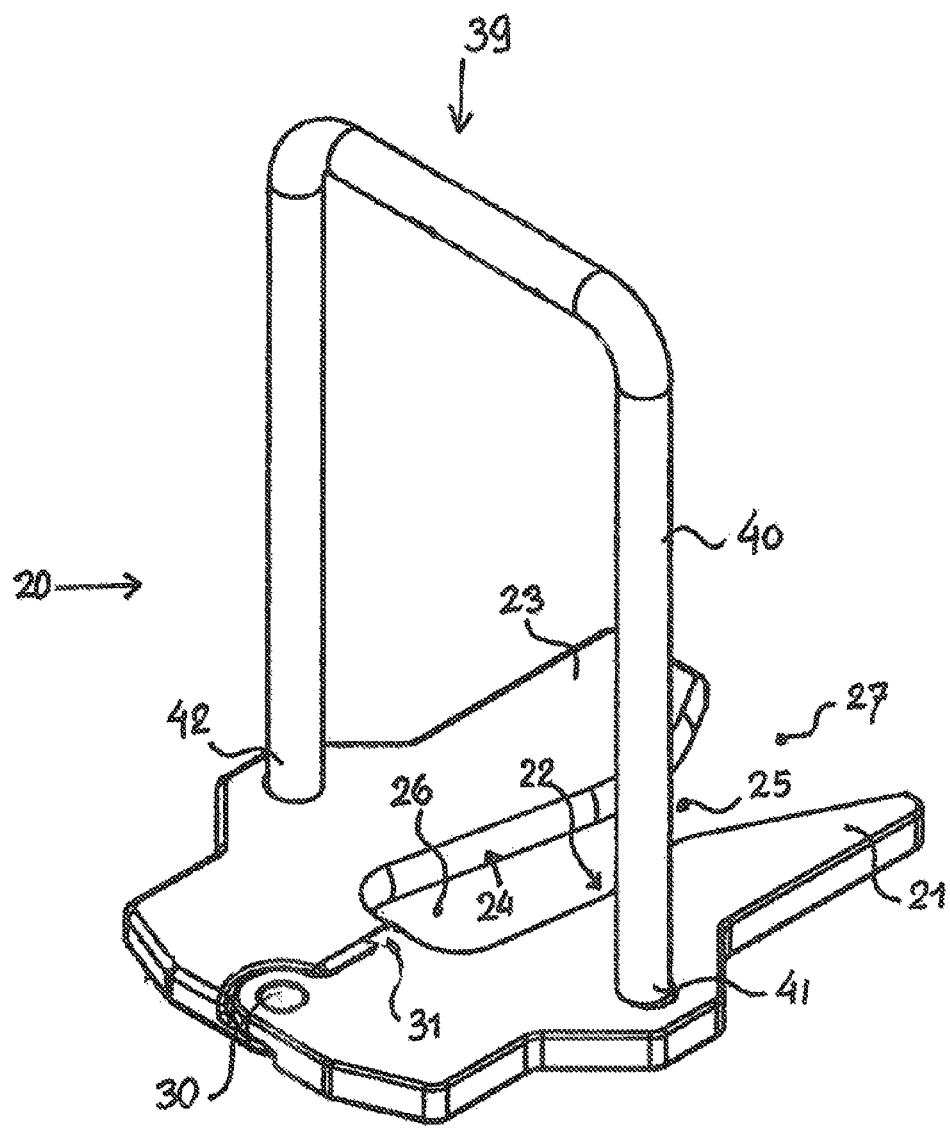
Figure 19:
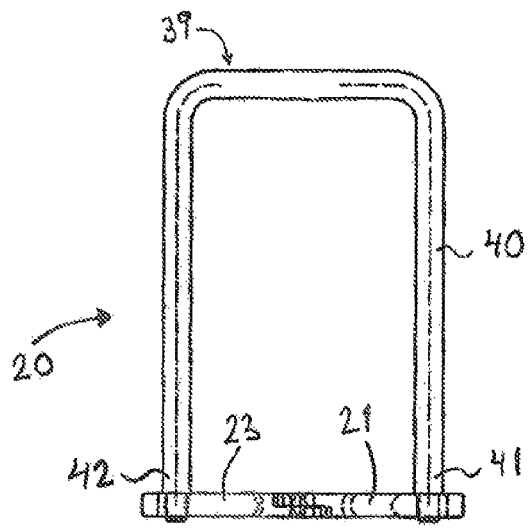
FIG. 19 shows a front view of an embodiment of the invention.
Figure 20:
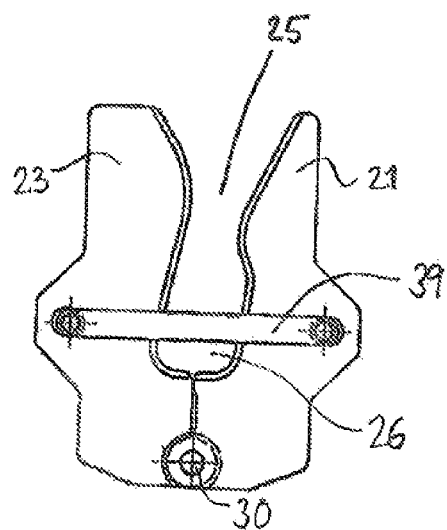
FIG. 20 shows a top view of an embodiment of the invention.
Figure 21:
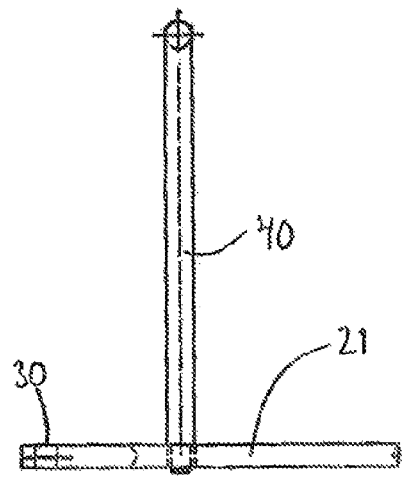
FIG. 21 shows a side view of an embodiment of the invention.

FIG. 41 shows a side view of a further embodiment. Trolley 75 is only shown in part.

The invention claimed is:

1. A system for conveying carcasses or carcass parts of quadruped slaughter animals, which system comprises at least one carrier, which carrier comprises:

a first jaw element, which first jaw element has an engagement face for engaging the carcass or carcass part, a second jaw element, which second jaw element has an engagement face for engaging the carcass or carcass part, the engagement face of the first jaw element and the engagement face of the second jaw element being spaced apart and together defining two opposite side walls of a retaining part of a holding slot for retaining the carcass or carcass part, the distance between the engagement face of the first jaw element and the engagement face of the second jaw element defining the width of the retaining part of the holding slot, the first jaw element and the second jaw element being moveable relative to each other such that the width of the retaining part of the holding slot is variable over a width range that extends between a minimum width and a maximum width, which carrier further comprises a tensioning structure, which tensioning structure has a first connection zone and a second connection zone, the first connection zone being connected to the first jaw element and the second connection zone being connected to the second jaw element, the connection between the first connection zone of the tensioning structure and the first jaw element and the connection between the second connection zone of the tensioning structure and the second jaw element being such that when the jaw elements move relative to each other when receiving a carcass or carcass part in the retaining part of the holding slot, the first connection zone moves along with the first jaw element and the second connection zone moves along with the second jaw element, which movement of the connection zones causes elastic deformation of the tensioning structure, said elastic deformation providing a clamping force to the engagement faces of the jaw elements such that the carcass or carcass part is retained in the holding slot by clamping a part of the carcass or carcass part between the engagement face of the first jaw element and the engagement face of the second jaw element.

2. The system according to claim 1, wherein the tensioning structure comprises an elastic bar or a bracket.

3. The system according to claim 2, wherein the first jaw element and the second jaw element of the carrier are hingedly connected to each other by a hinge.

4. The system according to claim 3, wherein the distance between the hinge and the connection between the elastic bar and the first jaw element is 5 cm or less, and/or wherein the distance between the hinge and the connection between the elastic bar and the second jaw element is 5 cm or less.

5. The system according to claim 1, wherein the tensioning structure provides a pretensioning force such that the first and second jaw elements are biased towards each other.

6. The system according to claim 1, wherein at least one jaw element is a jaw plate.

7. The system according to claim 1, wherein the tensioning structure is subjected to bending and/or torsion and/or tension and/or compression when the jaw elements move relative to each other.

8. The system according to claim 1, wherein the connection between the tensioning structure and the first jaw element is either a rigid connection or a connection that allows relative rotation between the elastic bar and the first jaw element, and wherein the connection between the tensioning structure and the second jaw element is either a rigid connection or a connection that allows relative rotation between the elastic bar and the second jaw element.

9. The system according to claim 1, wherein the first jaw element and the second jaw element extend in a plane, and the tensioning structure extends at an angle between 45° and 135° relative to the plane of the jaw elements.

10. The system according to claim 1, wherein the tensioning structure of the carrier comprises a straight or curved rod, and/or wherein the tensioning structure is generally U-shaped.

11. The system according to claim 1, wherein during use the holding slot of the carrier is open on one end.

12. The system according to claim 1, wherein:
the first jaw element and/or the second jaw element of the carrier comprises a protrusion, which protrusion or protrusions form an abutment for the first and second jaw element relative to each other to prevent that the width of the retaining part of the holding slot becomes smaller than the minimum width, and/or
the first and second jaw part each comprises an inner abutment wall, which inner abutment walls engage each other when the retaining part of the holding slot has the minimum width, and/or
the first and second jaw part each comprises an outer abutment wall, which outer abutment walls engage each other when the retaining part of the holding slot has the maximum width.

13. The system according to claim 1, wherein the carrier further comprises an adjuster for adjusting the minimum and/or maximum width of the retaining part of holding slot.

14. The system according to claim 1, wherein the holding slot of the carrier is dimensioned such that a carcass or carcass part is retained in the holding slot by the clamping force exerted on the carcass or carcass part by the engagement faces of the jaw elements, during which clamping the jaw elements are in a relative position in which the retaining part of the holding slot has the minimum width, the maximum width or a width between the minimum width and the maximum width.

15. The system according to claim 1, wherein the holding slot of the carrier is adapted to receive a pig foot, and wherein the width of the holding slot is adapted such that the lateral metatarsal or metacarpal bones in the pig foot are pressed from their natural position to a position closer to the engagement face of the first or the second jaw element.

16. The system according to claim 1, wherein the shape of the engagement face of the first jaw element and the shape of the engagement face of the second jaw element of the carrier are mirror images of each other, and wherein the shape of the first jaw element and the shape of the second jaw element are mirror images of each other.

17. The system according to claim 1, the tensioning structure is at least partly made of spring steel, stainless steel, stainless spring steel or a plastic material.

18. The system according to claim 1, wherein at least one of the engagement faces of the carrier is rounded.

19. The system according to claim 1, wherein the carrier further comprises a locking element for locking the carcass or carcass part into the holding slot of the carrier, which locking element extends at least partly over or within the holding slot, which locking element is mounted on a lever.

20. The system according to claim 1, which system comprises multiple carriers, which system further comprises an overhead conveyor system, which overhead conveyor system comprises a track and a plurality of trolleys, and a drive system which is adapted to move the trolleys along said track, in which system each carrier is connected to a trolley of the overhead conveyor system.

21. The system according to claim 20, wherein at least one trolley is attached to the tensioning structure of a carrier.

22. The system according to claim 20, wherein one carrier comprises a control element for controlling the position and/or orientation of the carrier relative to the trolley and/or relative to the track.

23. The system according to claim 22, wherein the control element is a cam roller, which cam roller is attached to the first and/or the second jaw element, and wherein the system further comprises a stationary guide which is arranged adjacent to at least a part of the track of the overhead conveyor in such a way that the cam roller engages the stationary guide when the carrier with the cam roller moves along the stationary guide.

24. The system according to claim 20, which system comprises one or more processing stations for manually, automatically or semi-automatically carrying out one or more process steps on the carcass or carcass part while the carcass or carcass parts are retained in a carrier, which processing stations are arranged along the track over the overhead conveyor.

25. The system according to claim 1, wherein:
the tension structure is a bracket, which bracket comprises a first leg, a second leg, the first leg and the second leg being connected to each other either directly or via a connection piece, the first leg having a connection end which is connected to the first jaw part and the second leg having a connection end which is connected to the second jaw part,
the connection between the first leg of the bracket and the first jaw element and the connection between the second leg of the bracket and the second jaw element is such that when the jaw elements move relative to each other when receiving the leg part in the retaining part of the holding slot, the connection end of the first leg moves along with the first jaw element and the connection end of the second leg moves along with the second jaw element, which movement causes elastic deformation of the bracket,
said elastic deformation provides a clamping force to the engagement faces of the jaw elements such that the leg part is retained in the holding slot by clamping the leg part between the engagement face of the first jaw element and the engagement face of the second jaw element.

26. The system according to claim 25, wherein the legs are connected to each other by a connection piece, which is arranged at a distance from the jaw elements.

27. The system according to claim 26, the connection piece of the bracket is made of plastic and the legs of the bracket are made of stainless steel.

\* \* \* \* \*